United States Patent
Murillo et al.

(10) Patent No.: US 12,540,359 B2
(45) Date of Patent: Feb. 3, 2026

(54) HER2 HETEROGENEITY AS A BIOMARKER IN CANCER

(71) Applicants: GENENTECH, INC., San Francisco, CA (US); VENTANA MEDICAL SYSTEMS, INC., Tucson, AZ (US); NATIONAL CANCER CENTER, Tokyo (JP)

(72) Inventors: Adrian E. Murillo, Tucson, AZ (US); Hiro Nitta, Tucson, AZ (US); Donald G. Munroe, Tucson, AZ (US); Amy A. Lo, San Francisco, CA (US); Takeshi Kuwata, Kashiwa (JP); Akio Kaito, Kashiwa (JP); Atsushi Ochiai, Kashiwa (JP)

(73) Assignees: GENENTECH, INC., South San Francisco, CA (US); NATIONAL CANCER CENTER, Tokyo (JP); VENTANA MEDICAL SYSTEMS, INC., Tucson, AZ (US)

( * ) Notice: Subject to any disclaimer, the term of this patent is extended or adjusted under 35 U.S.C. 154(b) by 259 days.

(21) Appl. No.: 17/100,357

(22) Filed: Nov. 20, 2020

(65) Prior Publication Data
US 2021/0071270 A1   Mar. 11, 2021

Related U.S. Application Data

(63) Continuation of application No. PCT/EP2019/062972, filed on May 20, 2019.

(60) Provisional application No. 62/674,566, filed on May 21, 2018.

(51) Int. Cl.
C12Q 1/6886   (2018.01)
C12Q 1/682    (2018.01)
C12Q 1/686    (2018.01)

(52) U.S. Cl.
CPC ........... *C12Q 1/6886* (2013.01); *C12Q 1/682* (2013.01); *C12Q 1/686* (2013.01); *C12Q 2561/113* (2013.01); *C12Q 2600/118* (2013.01)

(58) Field of Classification Search
CPC ........... C12Q 1/6886; C12Q 2561/113; C12Q 1/686; C12Q 1/682; C12Q 2600/118; G01N 33/574; G01N 33/57415; G01N 33/57446
See application file for complete search history.

(56) References Cited

U.S. PATENT DOCUMENTS

| | | |
|---|---|---|
| 5,650,327 A | 7/1997 | Copeland |
| 5,654,200 A | 8/1997 | Copeland |
| 6,296,809 B1 | 10/2001 | Richards |
| 6,352,861 B1 | 3/2002 | Copeland |
| 6,582,962 B1 | 6/2003 | Richards |
| 6,649,138 B2 | 11/2003 | Adams |
| 6,670,113 B2 | 12/2003 | Hainfeld |
| 6,682,596 B2 | 1/2004 | Zehnder |
| 6,815,064 B2 | 11/2004 | Treadway |
| 7,632,652 B2 | 12/2009 | Bieniarz |
| 7,642,064 B2 | 1/2010 | Bieniarz |
| 8,603,765 B2 | 12/2013 | Tacha |
| 2003/0211630 A1 | 11/2003 | Richards |
| 2004/0052685 A1 | 3/2004 | Richards |
| 2004/0265922 A1 | 12/2004 | Bieniarz |
| 2013/0260379 A1 | 10/2013 | Alexander |
| 2017/0082627 A1 | 3/2017 | Dennis et al. |

FOREIGN PATENT DOCUMENTS

WO   2019224153 A1   11/2019

OTHER PUBLICATIONS

Wang et al., "Automated Quantitative RNA in Situ Hybridization for Resolution of Equivocal and Heterogeneous ERBB2 (HER2) Status in Invasive Breast Carcinoma", The Journal of Molecular Diagnostics, March, vol. 15, No. 2, pp. 210-219. (Year: 2013).*

Alba et al., "HER2 status determination using RNA-ISH—a rapid and simple technique showing high correlation with FISH and IHC in 141 cases of breast cancer," Hisol. Histopathol., vol. 27, pp. 1021-1027. (Year: 2012).*

Kurozumi et al., "HER2 intratumoral heterogeneity analyses by concurrent HER2 gene and protein assessment for the prognosis of HER2 negative invasive breast cancer patients," Breast Cancer Res. Treat., vol. 158, pp. 99-111. (Year: 2016).*

International Search Report for International Application No. PCT/EP2019/062972 mailed Aug. 16, 2019.

(Continued)

*Primary Examiner* — Young J Kim
(74) *Attorney, Agent, or Firm* — McBee Moore & Vanik IP, LLC

(57) ABSTRACT

A method for predicting responsiveness to a HER2-directed therapy by assessing HER2 heterogeneity in a tumor includes contacting a sample of the tumor with a biomarker-specific reagent that specifically binds to HER2 protein and detecting HER2 protein in the sample, contacting the sample of the tumor with a first nucleic acid probe that specifically binds HER2 genomic DNA and detecting HER2 gene amplification status in the sample, contacting the sample of the tumor with a second nucleic acid probe that specifically binds HER2 RNA and detecting HER2 RNA status in the sample scoring the HER2 protein (IHC), HER2 gene (DISH), and HER2 RNA (RNA-ISH), predicting that the tumor is responsive to the HER2-directed therapy if the tumor reveals a first foci having a first score and a second score, in which the first score and the second score are not the same.

4 Claims, 13 Drawing Sheets

(56) References Cited

OTHER PUBLICATIONS

H. Nitta, et al., "Breast cancer HER2 epigenetic intratumoral heterogeneity results from lack of HER2 protein translation," Cancer Research, (2018), vol. 78, No. 4.
Takuya Saito, et al., "Comparison of intratumoral heterogeneity of HER2 expression between primary tumor and multiple organ metastases in gastric cancer: Clinicopathological study of three autopsy cases and one resected case," Pathology international, (2015) vol. 65, No. 6: 309-17.
J. Rüschoff, et al., "Her2-Diagnostik beim Magnekazinom: Was ist anders im Vergleich zum Mammakarzinom?" Der Pathologie, (2010), vol. 31 : 208-17.
Y. Nishida, et al., "A novel gene-protein assay for evaluating HER2 status in gastric cancer: simultaneous analyses of HER2 protein overexpression and gene amplification reveal intratumoral heterogeneity," Gastric Cancer, (2015), vol. 18, No. 3: 458-66.
Farahani et al.: "Whole slide imaging in pathology: advantages, limitations, and emerging perspectives", Pathology and Laboratory Medicine Int'l, vol. 7, Jun. 2015 (Jun. 1, 2015), pp. 23-33.
"GenBank", Database accession No. XM_005257140.
"GenBank", Database accession No. XP_005257196.
"GenBank", Database accession No. XP_005257197.
Harlow et al.: "Antibodies, A Laboratory Manual", 1988, Cold Spring Harbor Publications (Abstract Only).
Ausubel et al.: "Current Protocols in Molecular Biology", 1992, Greene Publ. Assoc. and Wiley-Intersciences (Cover and Foreward provided).
Ruschoff J et al.: "Her2-Diagnostik beim Magenkarzinom; Was ist anders im Vergleich zum Mammakarzinom?", Der Pathologe ; Organ Der Deutschen Abteilung Der Internationalen Akademie Fur Pathologie, Der Deutschen, Der Osterreichischen Und Der Schweizerischen Gesellschaft Fur Pathologie Und Des Berufsverbandes Deutscher Pathologen, Springer, Berlin, DE, vol. 31, No. 3, May 5, 2010 (May 5, 2010), pp. 208-217, XP019843699, ISSN: 1432-1963.
Wurch et al.: "Development of Novel Protein Scaffolds as Alternatives to Whole Antibodies for Imaging and Therapy: Status on Discovery Research and Clinical Validation", Current Pharmaceutical Biotechnology, vol. 9, 2008, pp. 502-509.
SAMBROOK & GREEN: "Molecular Cloning: A Laboratory Manual", 1989, CSHL [Chapter of Contents].
"GenBank", Database accession No. NM_004448.
"GenBank", Database accession No. 2064.
Nitta et al: "Breast cancer HER2 epigenetic intratumoral heterogeneity results from lack of HER2 protein translation", Proceedings of The 2017 San Antonio Breast Cancer Symposium; Dec. 5-9, 2017, Dec. 5, 2017 (Dec. 5, 2017), San Antonio, TX. Philadelphia (PA), XP055610772, Retrieved from the Internet [retrieved on 20190805], DOI: 10.1158/1538-7445.SABCS17-P2-06-02Published (Abstract provided).
Wolff et al., "American Society of Clinical Oncology/College of American Pathologists Guideline Recommendations for Human Epidermal Growth Factor Receptor 2 Testing in Breast Cancer," J Clin Oncol, vol. 25, 2007, pp. 118-145.
Stack et al.: "Multiplexed immunohistochemistry, imaging, and quantitation: A review, with an assessment of Tyramide signal amplification, multispectral imaging and multiplex analysis", Methods, vol. 70, No. 1, Nov. 2014 (Nov. 1, 2014), pp. 46-58, XP055273702, DOI: doi: 10.1016/j.ymeth.2014.08.016.
"GenBank", Database accession No. NP_001005862.
"GenBank", Database accession No. NC_000017.10.
"GenBank", Database accession No. NP_004439.
Bartley et al., "HER2 Testing and Clinical Decision Making in Gastroesophageal Adenocarcinoma: Guideline From the College of American Pathologists, American Society for Clinical Pathology, and the American Society of Clinical Oncology," J. Clinical Oncology, vol. 35, No. 4, 2017, pp. 446-464.
Nishida et al., "A novel gene-protein assay for evaluating HER2 status in gastric cancer: simultaneous analyses of HER2 protein overexpression and gene amplification reveal intratumoral heterogeneity," Gastric Cancer, vol. 18, No. 3, Jul. 2015 (Jul. 1, 2015), pp. 458-466.
Hammond et al., "American Society of Clinical Oncology/College of American Pathologists guideline recommendations for immunohistochemical testing of estrogen and progesterone receptors in breast cancer (unabridged version)," Arch Pathol Lab Med, vol. 134, 2010, pp. 907-1101.
Saito et al.: "Comparison of intratumoral heterogeneity of HER2 expression between primary tumor and multiple organ metastases in gastric cancer: Clinicopathological study of three autopsy cases and one resected case : Gastric intratumoral HER2 heterogeneity", Pathology International, vol. 65, No. 6, Mar. 31, 2015 (Mar. 31, 2015), AU, pp. 309-317, XP055610671, ISSN: 1320-5463, DOI: 10.1111/pin. 12290.
"GenBank", Database accession No. XM_005257139.

* cited by examiner

HER2 HETEROGENEITY AS A BIOMARKER IN CANCER

CROSS-REFERENCE TO RELATED APPLICATIONS

This application is a By-Pass Continuation based on International Patent Application No. PCT/EP2019/062972, filed 20 May 2019, which claims priority to U.S. Provisional Patent Application No. 62/674,566, filed May 21, 2018, the content of which is incorporated herein by reference in its entirety.

BACKGROUND

1. Field

The present disclosure relates to methods of measuring tissue heterogeneity and using the same as a biomarker and predictive tool in the diagnosis and treatment of gastric cancer.

2. Description of Related Art

HER2 (human epidermal growth factor 2) is a membrane-bound tyrosine kinase in the ERBB family. The HER2 monomeric protein has three main regions: the extracellular amino-terminal region comprising four domains (I-IV), the hydrophobic transmembrane domain and the carboxy-terminal kinase domain comprising the juxtamembrane domain, tyrosine kinase and C-terminal tail with autophosphorylation sites. It has no known ligand, and heterodimerizes with other members of ERBB family on ligand binding to stimulate various intracellular signal transduction pathways involved in cell growth.

HER2 protein overexpression, gene amplification and mutation have been identified in a variety of cancer types. Evaluation of HER2 status is critical as a companion diagnostic for anti-HER2 targeted therapeutics. There are two different strategies for targeting HER2 that have been successfully employed in the clinic: (1) antibodies directed against the extracellular domain of the receptor and (2) small molecule Tyrosine Kinase Inhibitors (TKIs) acting on the intracellular kinase domain. Several agents targeting HER2-positive malignancies have been approved, including trastuzumab and pertuzumab (humanized monoclonal antibodies); lapatinib and afatinib (dual EGFR/HER2 inhibitors); and ado-trastuzumab emtansine (T-DMI) (an antibody-cytotoxic conjugate that combines the HER2-targeting antitumour property of trastuzumab with the cytotoxic microtubule-depolymerizing compound DM1). The presence of HER2 alterations in diverse cancers provides novel therapeutic opportunities.

U.S. 2017/0082627 discloses methods for predicting the response to a HER2-directed therapy and for scoring a breast cancer tumor sample including contacting the sample with an antibody that specifically binds HER2 protein and detecting presence and/or amount of HER2 protein and contacting the sample with a nucleic acid probe that specifically binds to HER2 genomic DNA and detecting presence and/or amount of HER2 genomic DNA (such as HER2 gene copy number). Methods may also include detection of a centromere nucleic acid (such as chromosome 17 centromere DNA) and contacting the sample with an antibody that specifically binds ER protein and detecting presence and/or amount of ER protein in the same sample.

Nishida et al. (Gastric Cancer, 2015 July; 18(3):458-66. Epub 2014 Jun. 11) discloses, using the tissue microarray technique, the HER2 status of each gastric cancer cases may be evaluated by immunohistochemistry (IHC), brightfield dual-color in situ hybridization (DISH), and gene-protein assay (GPA), which allows the simultaneous analysis of HER2 protein and gene status on a single slide. Intratumoral phenotypic and genotypic heterogeneity may be evaluated by comparing the HER2 statuses of two tissue cores from each case.

The solution to this technical problem is provided by the embodiments characterized in the claims.

BRIEF SUMMARY

The present disclosure generally relates to methods of identifying HER2 heterogeneity based on HER2 protein and one or more of HER2 RNA and HER2 gene amplification. The present disclosure also relates to methods of identifying HER2 protein-negative and HER2 RNA-positive tumor cells that are mainly localized at the invasive regions of the tumor, and thus this sub-population of HER2-positive tumor cells may be a good region-of-interest (ROI) to focus on for diagnosis.

The present application relates to methods for predicting responsiveness to a HER2-directed therapy by assessing HER2 heterogeneity in a tumor, comprising contacting a sample of the tumor with a biomarker-specific reagent that specifically binds to HER2 protein and detecting HER2 protein in the sample, and contacting the sample of the tumor with a nucleic acid probe that specifically binds HER2 RNA and detecting HER2 RNA status in the sample scoring the HER2 protein (IHC), and HER2 RNA (RNA-ISH), in which scoring is categorized as:

Group A for samples exhibiting IHC 3+ and RNA-ISH+,
Group B for samples exhibiting IHC 3+ and RNA-ISH−,
Group C for samples exhibiting IHC 2+ and RNA-ISH+,
Group D for samples exhibiting IHC 2+ and RNA-ISH−,
Group E for samples exhibiting IHC 0, 1+ and RNA-ISH+, and
Group F for samples exhibiting IHC 0, 1+ and RNA-ISH−, predicting that the tumor is responsive to the HER2-directed therapy if the tumor reveals a first foci having a first score selected from Group A to Group F and a second foci having a second score selected from Group A to Group F, in which the first score and the second score are not the same.

The present application relates to methods for scoring a tumor sample, including contacting a sample of the tumor with a biomarker-specific reagent that specifically binds to HER2 protein and detecting HER2 protein in the sample and contacting the sample of the tumor with a second nucleic acid probe that specifically binds HER2 RNA and detecting HER2 RNA status in the sample scoring the HER2 protein (IHC), HER2 gene (DISH), and HER2 RNA (RNA-ISH), in which scoring is categorized as:

Group A for samples exhibiting IHC 3+ and RNA-ISH+,
Group B for samples exhibiting IHC 3+ and RNA-ISH−,
Group C for samples exhibiting IHC 2+ and RNA-ISH+,
Group D for samples exhibiting IHC 2+ and RNA-ISH−,
Group E for samples exhibiting IHC 0, 1+ and RNA-ISH+, and
Group F for samples exhibiting IHC 0, 1+ and RNA-ISH−, predicting that the tumor is at least partially responsive to the HER2-directed therapy if at least one discrete foci has a score selected from Group A-D, and predicting that the tumor is not likely to completely respond to the HER2-directed therapy if the tumor reveals at least one discrete foci having a score selected from Group E or Group F.

The present application relates to methods for predicting responsiveness to a HER2-directed therapy by assessing HER2 heterogeneity in a tumor, including contacting a sample of the tumor with a biomarker-specific reagent that specifically binds to HER2 protein and detecting HER2 protein in the sample, optionally, contacting the sample of the tumor with a first nucleic acid probe that specifically binds HER2 genomic DNA and detecting HER2 gene amplification status in the sample, optionally, contacting the sample of the tumor with a second nucleic acid probe that specifically binds HER2 RNA and detecting HER2 RNA status in the sample scoring the HER2 protein (IHC), optionally, HER2 gene (DISH), and optionally, HER2 RNA (RNA-ISH), in which scoring is categorized as:
  Group A for samples exhibiting IHC 3+ and optionally, DISH+, optionally, RNA-ISH+,
  Group B for samples exhibiting IHC 3+ and optionally, DISH−, optionally, RNA-ISH−,
  Group C for samples exhibiting IHC 2+ and optionally, DISH+, optionally, RNA-ISH+,
  Group D for samples exhibiting IHC 2+ and optionally, DISH−, optionally, RNA-ISH−,
  Group E for samples exhibiting IHC 0, 1+ and optionally, DISH+, optionally, RNA-ISH+, and
  Group F for samples exhibiting IHC 0, 1+ and optionally, DISH−, optionally, RNA-ISH−,
predicting that the tumor is responsive to the HER2-directed therapy if the tumor reveals a first foci having a first score selected from Group A to Group F and a second foci having a second score selected from Group A to Group F, in which the first score and the second score are not the same.

The present application relates to methods for scoring a tumor sample, including contacting a sample of the tumor with a biomarker-specific reagent that specifically binds to HER2 protein and detecting HER2 protein in the sample, optionally, contacting the sample of the tumor with a first nucleic acid probe that specifically binds HER2 genomic DNA and detecting HER2 gene amplification status in the sample, optionally, contacting the sample of the tumor with a second nucleic acid probe that specifically binds HER2 RNA and detecting HER2 RNA status in the sample scoring the HER2 protein (IHC), optionally, HER2 gene (DISH), and optionally, HER2 RNA (RNA-ISH), in which scoring is categorized as:
  Group A for samples exhibiting IHC 3+ and optionally, DISH+, optionally, RNA-ISH+,
  Group B for samples exhibiting IHC 3+ and optionally, DISH−, optionally, RNA-ISH−,
  Group C for samples exhibiting IHC 2+ and optionally, DISH+, optionally, RNA-ISH+,
  Group D for samples exhibiting IHC 2+ and optionally, DISH−, optionally, RNA-ISH−,
  Group E for samples exhibiting IHC 0, 1+ and optionally, DISH+, optionally, RNA-ISH+, and
  Group F for samples exhibiting IHC 0, 1+ and optionally, DISH−, optionally, RNA-ISH−,
predicting that the tumor is responsive to the HER2-directed therapy if the tumor reveals a first foci having a first score selected from Group A to Group F and a second foci having a second score selected from Group A to Group F, in which the first score and the second score are not the same.

The present application relates to methods for predicting responsiveness to a HER2-directed therapy by assessing HER2 heterogeneity in a tumor, including contacting a sample of the tumor with a biomarker-specific reagent that specifically binds to HER2 protein and detecting HER2 protein in the sample and contacting the sample of the tumor with a nucleic acid probe that specifically binds HER2 RNA and detecting HER2 RNA status in the sample scoring the HER2 protein (IHC) and HER2 RNA (RNA-ISH) in an invasive region of the tumor, in which scoring is categorized as:
  Group A for samples exhibiting IHC 3+ and RNA-ISH+,
  Group B for samples exhibiting IHC 3+ and RNA-ISH−,
  Group C for samples exhibiting IHC 2+ and RNA-ISH+,
  Group D for samples exhibiting IHC 2+ and RNA-ISH−,
  Group E for samples exhibiting IHC 0, 1+ and RNA-ISH+, and
  Group F for samples exhibiting IHC 0, 1+ and RNA-ISH−,
predicting that the tumor is at least partially responsive to the HER2-directed therapy if the invasive region of the tumor has a score selected from Group A to Group D, and predicting that the tumor is unlikely to be responsive to the HER2-directed therapy if the invasive region has a score of Group E or Group F.

The present application relates to methods for scoring a tumor sample, including contacting a sample of the tumor with a biomarker-specific reagent that specifically binds to HER2 protein and detecting HER2 protein in the sample, contacting the sample of the tumor with a first nucleic acid probe that specifically binds HER2 genomic DNA and detecting HER2 gene amplification status in the sample, contacting the sample of the tumor with a second nucleic acid probe that specifically binds HER2 RNA and detecting HER2 RNA status in the sample scoring the HER2 protein (IHC), HER2 gene (DISH), and HER2 RNA (RNA-ISH) in an invasive region of the tumor, in which scoring is categorized as:
  Group A for samples exhibiting IHC 3+ and DISH+, RNA-ISH+,
  Group B for samples exhibiting IHC 3+ and DISH−, RNA-ISH−,
  Group C for samples exhibiting IHC 2+ and DISH+, RNA-ISH+,
  Group D for samples exhibiting IHC 2+ and DISH−, RNA-ISH−,
  Group E for samples exhibiting IHC 0, 1+ and DISH+, RNA-ISH+, and
  Group F for samples exhibiting IHC 0, 1+ and DISH−, RNA-ISH−,
predicting that the tumor is at least partially responsive to the HER2-directed therapy if the invasive region of the tumor has a score selected from Group A to Group D, and predicting that the tumor is unlikely to be responsive to the HER2-directed therapy if the invasive region has a score of Group E or Group F.

The present application relates to methods of identifying HER2 heterogeneity in a tumor, including contacting a sample of the tumor with a biomarker-specific reagent that specifically binds to HER2 protein and detecting HER2 protein in the sample, contacting the sample of the tumor with a nucleic acid probe that specifically binds HER2 RNA and detecting HER2 RNA status in the sample, in which, if the HER2 protein is not homogenously detected, evaluating the HER2 RNA status at an invasive margin, identifying the HER2 heterogeneity, if the HER2 RNA status is negative at the invasive margin.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements.

DETAILED DESCRIPTION

Figure 1:
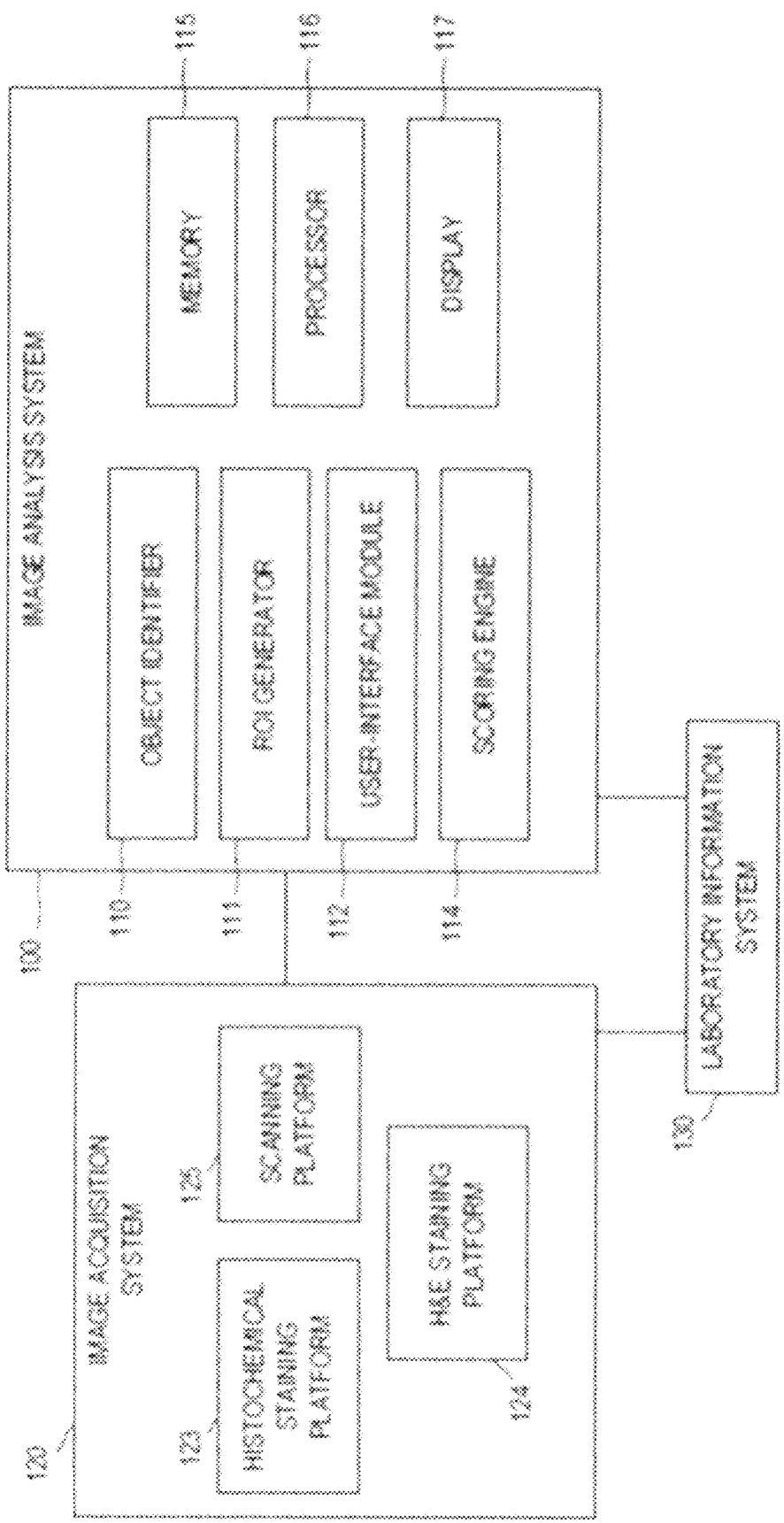
FIG. 1 shows an imaging system in accordance with one embodiment of the present disclosure.

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

Embodiments of the present disclosure include methods of assessing and/or scoring HER2 heterogeneity in tumors, e.g., solid tumors, that may have HER2 protein overexpression and genomic alterations, for example, gastric cancer, breast cancer, lung cancer, salivary gland cancer, ovarian cancer, pancreatic cancer, endometrial cancer, colorectal cancer, esophageal cancer, bladder cancer, biliary tract cancer, uterine cervical cancer, and head and neck squamous cell cancer.

Amplification of the HER2 gene and overexpression of its product were first discovered in breast cancer and are significantly associated with worse outcomes. Many studies have demonstrated that HER2 is also present in several other malignancies, particularly, gastric and gastroesophageal cancer (GC).

HER2 in Gastric Cancers

The frequency of HER2 overexpression in gastric and gastroesophageal cancer ranges from 4.4% to 53.4%, with a mean of 17.9%. a larger number of studies indicate that HER2 is a negative prognostic factor, showing more aggressive biological behavior and higher frequencies of recurrence in HER2-positive tumors, suggesting that HER2 overexpression/amplification is a molecular abnormality that might be associated with the development of gastric cancer.

HER2 testing in gastric cancer differs from testing in breast cancer because of inherent differences in tumor biology, intratumoral heterogeneity of HER2 expression and incomplete membrane staining that are commonly observed in gastric tumors. The key differences between HER2 expression in breast and gastric and gastroesophageal cancer may be (1) the membranous distribution of the antibody in the neoplastic cells of breast cancer is predominantly circumferential, whereas in gastric cancer, it is generally incomplete, predominantly basolateral ("U"-shaped) or lateral (parallel lines). Thus, unlike for breast cancer, circularity of IHC staining is not a criterion for HER2 IHC scoring in gastric cancer; (2) intratumoral heterogeneity, defined as the presence of areas with different HER2 scores within the same tumor, i.e., focal or patchy positivity, is a common pattern encountered in gastric tumors but is only rarely seen in breast cancer. It may cause sampling errors when randomly sampled biopsies are examined. Although the causes of intratumoral heterogeneity of HER2 expression are not yet fully understood, some studies indicate that it could be explained merely by tumor inherent genetic heterogeneity; and (3) variation of the incidence of HER2 expression with anatomic location does not occur in breast cancer, whereas it is more frequent in the proximal stomach, including the esophageal gastric junction, than in the distal stomach.

HER2 in Non-Breast and Non-Gastric Cancers

HER2 protein overexpression and genomic alterations also exist in a subset of patients with non-breast and non-gastric cancers, suggesting that anti-HER2 targeted therapy may be useful in these patients.

HER2 in Lung Cancers

HER2 protein overexpression and gene amplification have been described in 7%-23% and 2%-22%, respectively, of NSCLC patients. In a meta-analysis of 2579 NSCLC patients, HER2 IHC overexpression was associated with a poor prognosis in adenocarcinoma. Another meta-analysis of 6135 patients also identified HER2 protein overexpression as a poor prognostic marker in lung cancer. A few early clinical trials exploring the outcomes of treatment with trastuzumab either as monotherapy or combined therapy have shown only modest or minimal clinical benefit in HER2 IHC-positive NSCLC. However, a trend towards better clinical outcome was seen in patients treated with trastuzumab combination therapy in HER2 3+ positive overexpression or FISH-positive NSCLC. A case of HER2-amplified NSCLC showed a 51% regression in tumor size after lapatinib monotherapy.

HER2 in Salivary Gland Tumors

Malignant tumors of salivary gland are rare lesions and often have poor prognoses. The prevalence of HER2 protein overexpression in salivary gland tumors ranges from 4 to 21%. Salivary gland carcinoma comprises a wide spectrum of histological subtypes, and among these, the subtype reportedly with the highest prevalence of HER2 protein overexpression/amplification is salivary duct carcinoma (SDC). SDC represents 1-3% of all malignant salivary glands tumors and resembles high-grade ductal carcinoma of the breast histologically. It is an aggressive tumor with a high risk of local and distant recurrence, and is associated with high mortality and poor response to treatment. It can arise de novo or as the malignant component of carcinoma ex-pleomorphic adenoma. In view of the poor outcomes, several therapeutic approaches have been studied. Several studies reported encouraging results for trastuzumab-based chemotherapy in HER2-positive SDC.

HER2 in Ovarian Cancer

HER2 protein overexpression occurs in 5-19% of epithelial ovarian cancer (EOC). Among the various histological subtypes of epithelial ovarian carcinomas, it appears that HER2 gene amplification and protein overexpression is most common in the mucinous subtype. Somatic HER2 mutations have also been identified in epithelial ovarian carcinomas.

HER2 in Pancreatic Cancer

Pancreatic cancer is an aggressive tumor; 5-year survival rates are generally less than 5%, and treatment options are limited. The prevalence of HER2 overexpression in pancreatic cancer ranges from 7% to 61% and 2%-24%, respectively.

HER2 in Endometrial Cancer

Endometrial carcinoma is the most common gynecological malignancy, and histological subtypes include endometrioid, serous and clear cell carcinomas. The prevalence of HER2 overexpression and amplification in endometrial carcinomas ranges from 17% to 52% and 11%-21%, respectively; and appears to be most frequent in the serous histological subtype. Clinical responses to trastuzumab have been documented in HER2-overexpressing endometrial carcinomas.

HER2 in Colorectal Cancer

Unlike breast and gastric cancers, the prevalence of HER2 membranous overexpression in colorectal cancers appears to be low (1%-6%). However, if cytoplasmic overexpression is included, the prevalence appears to be higher (26%-48%). Partial responses to anti-HER2 therapeutics, in combination with other agents, have been reported in colorectal cancer patients. The combination of cetuximab and pertuzumab in refractory colorectal cancer was associated with some antitumor activity despite intolerable drug toxicities.

HER2 in Oesophageal Cancer

The prevalence of HER2 overexpression and/or genomic amplification in oesophageal cancers ranges from 15% to 39%. Complete response to lapatinib was documented in a single case of HER2-amplified oesophageal adenocarcinoma.

HER2 in Other Cancers

In addition to the cancers noted above, HER2 overexpression, amplification and mutation has been reported in other cancer types. In bladder cancer, amplification and/or overexpression were also identified. However, the exact figures for HER2 overexpression and/or amplification incidence are still uncertain, and vary from 9% to 76% for overexpression and 5%-42% for genomic amplification. A large multicenter series investigating 1005 primary invasive bladder carcinomas found HER2 protein overexpression in 9.2% of tumor samples. For biliary tract cancer, the prevalence of HER2 overexpression ranges from 9% to 20% and a frequency of 5% and 8% for genomic amplification. For uterine cervical cancer, the prevalence of HER2 overexpression was found to be 3-50%. For the head and neck squamous cell cancer, the prevalence of HER2 protein expression was reported to be between 2% and 50%.

Terms

In order to facilitate review of the various embodiments of the disclosure, the following explanations of specific terms are provided:

Biomarker: As used herein, the term "biomarker" shall refer to any molecule or group of molecules found in a biological sample that can be used to characterize the biological sample or a subject from which the biological sample is obtained. For example, a biomarker may be a molecule or group of molecules whose presence, absence, or relative abundance is: characteristic of a particular cell or tissue type or state; characteristic of a particular pathological condition or state; or indicative of the severity of a pathological condition, the likelihood of progression or regression of the pathological condition, and/or the likelihood that the pathological condition will respond to a particular treatment. As another example, the biomarker may be a cell type or a microorganism (such as a bacteria, mycobacteria, fungi, viruses, and the like), or a substituent molecule or group of molecules thereof.

Biomarker-specific reagent: A specific detection reagent that is capable of specifically binding directly to one or more biomarkers in the cellular sample, such as a primary antibody.

Detection reagent: A "detection reagent" is any reagent that is used to deposit a stain in proximity to a biomarker-specific reagent in a cellular sample. Non-limiting examples include biomarker-specific reagents (such as primary antibodies), secondary detection reagents (such as secondary antibodies capable of binding to a primary antibody), tertiary detection reagents (such as tertiary antibodies capable of binding to secondary antibodies), enzymes directly or indirectly associated with the biomarker specific reagent, chemicals reactive with such enzymes to effect deposition of a fluorescent or chromogenic stain, wash reagents used between staining steps, and the like.

Detectable labels include chromogenic, fluorescent, phosphorescent and/or luminescent molecules, catalysts (such as enzymes) that convert one substance into another substance to provide a detectable signal (such as by converting a colorless substance into a colored substance or vice versa, or by producing a precipitate or increasing sample turbidity), haptens that can be detected through antibody-hapten binding interactions using additional detectably labelled antibody conjugates, and paramagnetic and magnetic molecules or materials. Particular examples of detectable labels include: enzymes, such as horseradish peroxidase, alkaline phosphatase, acid phosphatase, glucose oxidase, β-galactosidase or β-glucuronidase; fluorophores, such as fluoresceins, luminophores, coumarins, BODIPY dyes, resorufins, and rhodamines (many additional examples of fluorescent molecules can be found in The Handbook—A Guide to Fluorescent Probes and Labeling Technologies, Molecular Probes, Eugene, Oreg.); nanoparticles, such as quantum dots (U.S. Pat. Nos. 6,815,064, 6,682,596 and 6,649,138, each of which patents is incorporated by reference herein); metal chelates, such as DOTA and DPTA chelates of radioactive or paramagnetic metal ions like $Gd^{3+}$; and liposomes, for example, liposomes containing trapped fluorescent molecules. Where the detectable label includes an enzyme, a detectable substrate such as a chromogen, a fluorogenic compound, or a luminogenic compound is used in combination with the enzyme to generate a detectable signal (a wide variety of such compounds are commercially available, for example, from Life Technologies, Carlsbad, Calif.)

Alternatively, an enzyme can be used in a metallographic detection scheme. In some examples, metallographic detection methods include using an enzyme, such as alkaline phosphatase, in combination with a water-soluble metal ion and a redox-inactive substrate of the enzyme. The substrate is converted to a redox-active agent by the enzyme, and the redox-active agent reduces the metal ion, causing it to form a detectable precipitate (see, for example, U.S. Pat. Nos. 7,642,064; 7,632,652; each of which is incorporated by reference herein). In other examples, metallographic detection methods include using an oxido-reductase enzyme (such as horseradish peroxidase) along with a water-soluble metal ion, an oxidizing agent and a reducing agent, again to form a detectable precipitate (see, for example, U.S. Pat. No. 6,670,113, which is incorporated by reference herein). Haptens are small molecules that can be bound by antibodies. Exemplary haptens include dinitrophenyl (DNP), biotin, digoxigenin (DIG), and fluorescein. Additional haptens include oxazole, pyrazole, thiazole, nitroaryl, benzofuran, triperpene, urea, thiourea, rotenoid, coumarin and cyclolignan haptens, such as those disclosed in U.S. Pat. No. 7,695,929, which is incorporated by reference herein.

Intra-tumoral region: Tissue located inside of a tumor region.

Invasive margin (IM): The interface between invasive neoplastic tissue and normal tissue. When used in the context of an ROI, "IM" refers to an ROI restricted to a region of a tumor identified by an expert reader as an invasive margin.

Peri-tumoral (PT) region: The region of a tumor in the immediate vicinity of the invasive margin, which may also include a portion of the extra-tumoral tissue and a portion of the tumor core.

Peri-tumoral (PT) ROI: An ROI including at least a portion of the IM region, and optionally extra-tumoral tissue in the immediate vicinity of the IM region and/or a portion of the tumor core region in the immediate vicinity of the IM. For example, "PT ROI" may encompass all pixels within a defined distance of any point on the interface between tumor cells and non-tumor cells, or it may encompass an ROI of a defined width centered on the interface between tumor cells and non-tumor cells, or it may encompass an plurality of defined shapes each centered at a point on the interface between tumor cells and non-tumor cells (such as a plurality of overlapping circles, each centered at a discrete point on the interface between tumor cells and non-tumor cells).

Sample: As used herein, the term "sample" shall refer to any material obtained from a subject capable of being tested for the presence or absence of a biomarker.

Secondary detection reagent: A specific detection reagent capable of specifically binding to a biomarker-specific reagent.

Section: When used as a noun, a thin slice of a tissue sample suitable for microscopic analysis, typically cut using a microtome. When used as a verb, the process of generating a section.

Serial section: As used herein, the term "serial section" shall refer to any one of a series of sections cut in sequence by a microtome from a tissue sample. For two sections to be considered "serial sections" of one another, they do not necessarily need to be consecutive sections from the tissue, but they should generally contain sufficiently similar tissue structures in the same spatial relationship, such that the structures can be matched to one another after histological staining.

Simplex histochemical stain: A histochemical staining method in which a single biomarker-specific reagent is applied to a single section and stained with a single color stain.

Specific detection reagent: Any composition of matter that is capable of specifically binding to a target chemical structure in the context of a cellular sample. As used herein, the phrase "specific binding," "specifically binds to," or "specific for" or other similar iterations refers to measurable and reproducible interactions between a target and a specific detection reagent, which is determinative of the presence of the target in the presence of a heterogeneous population of molecules including biological molecules. For example, an antibody that specifically binds to a target is an antibody that binds this target with greater affinity, avidity, more readily, and/or with greater duration than it binds to other targets. In one embodiment, the extent of binding of a specific detection reagent to an unrelated target is less than about 10% of the binding of the antibody to the target as measured, e.g., by a radioimmunoassay (RIA). In certain embodiments, a biomarker-specific reagent that specifically binds to a target has a dissociation constant (Kd) of ≤1 µM, ≤100 nM, ≤10 nM, ≤1 nM, or ≤0.1 nM. In another embodiment, specific binding can include, but does not require exclusive binding. Exemplary specific detection reagents include nucleic acid probes specific for particular nucleotide sequences; antibodies and antigen binding fragments thereof; and engineered specific binding compositions, including ADNECTINs (scaffold based on 10th FN3 fibronectin; Bristol-Myers-Squibb Co.), AFFIBODYs (scaffold based on Z domain of protein A from *S. aureus*; Affibody AB, Solna, Sweden), AVIMERs (scaffold based on domain A/LDL receptor; Amgen, Thousand Oaks, CA), dAbs (scaffold based on VH or VL antibody domain; GlaxoSmithKline PLC, Cambridge, UK), DARPins (scaffold based on Ankyrin repeat proteins; Molecular Partners AG, Zürich, CH), ANTICALINs (scaffold based on lipocalins; Pieris AG, Freising, DE), NANOBODYs (scaffold based on VHH (camelid Ig); Ablynx N/V, Ghent, BE), TRANS-BODYs (scaffold based on Transferrin; Pfizer Inc., New York, NY), SMIPs (Emergent Biosolutions, Inc., Rockville, MD), and TETRANECTINs (scaffold based on C-type lectin domain (CTLD), tetranectin; Borean Pharma A/S, Aarhus, DK). Descriptions of such engineered specific binding structures are reviewed by Wurch et al., Development of Novel Protein Scaffolds as Alternatives to Whole Antibodies for Imaging and Therapy: Status on Discovery Research and Clinical Validation, Current Pharmaceutical Biotechnology, Vol. 9, pp. 502-509 (2008), the content of which is incorporated by reference.

Stain: When used as a noun, the term "stain" shall refer to any substance that can be used to visualize specific molecules or structures in a cellular sample for microscopic analysis, including brightfield microscopy, fluorescent microscopy, electron microscopy, and the like. When used as a verb, the term "stain" shall refer to any process that results in deposition of a stain on a cellular sample.

Subject: As used herein, the term "subject" or "individual" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

Test sample: A tumor sample obtained from a subject having an unknown outcome at the time the sample is obtained.

Tissue sample: As used herein, the term "tissue sample" shall refer to a cellular sample that preserves the cross-sectional spatial relationship between the cells as they existed within the subject from which the sample was obtained.

Tumor core (TC): The region of an invasive neoplastic lesion that is not the invasive margin. In the context of an ROI, "TC" refers to a portion of a whole tumor region that is neither IM nor excluded from the ROI as an artifact.

Tumor sample: A tissue sample obtained from a tumor.

Whole tumor (WT) region: A portion of a tissue section characterized by one or more contiguous regions composed substantially entirely of invasive neoplastic cells, including both TC and IM regions.

Whole tumor ROI: An ROI limited to a whole tumor region.

HER2: Also known as v-erb-b2 avian erythroblastic leukemia viral oncogene homolog 2 (ErbB2), human epidermal growth factor receptor 2, HER2/neu, c-erb B2/neu, and neuroblastoma/glioblastoma derived oncogene homolog; GenBank Gene ID Accession No. 2064. As a member of the epidermal growth factor receptor tyrosine kinase family, Her2 heterodimerizes with other ligand-bound EGF receptor family members, though it lacks a ligand binding domain and cannot bind ligands itself. Amplification and/or overexpression of Her2 occur in several types of cancer, including breast and ovarian cancer.

HER2 nucleic acid and protein sequences are publicly available. For example, the HER2 gene is located on chromosome 17q12 and its sequence is disclosed as GenBank Accession No. NC_000017.10 (37844167-37884915). GenBank Accession Nos. NM_001005862, NM_004448, XM_005257139, and XM_005257140 disclose HER2 nucleic acid sequences, and GenBank Accession Nos.: NP_001005862, NP_004439, XP_005257196, and XP_005257197 disclose Her2 protein sequences, all of which are incorporated by reference as provided by GenBank on Oct. 4, 2013.

Histochemical detection: A process involving labelling biomarkers or other structures in a tissue sample with biomarker-specific reagents and detection reagents in a manner that permits microscopic detection of the biomarker or other structures in the context of the cross-sectional relationship between the structures of the tissue sample. Examples include affinity histochemistry (AHC), such as immunohistochemistry (IHC), chromogenic in situ hybridization (CISH), fluorescent in situ hybridization (FISH), and silver in situ hybridization (SISH), and hematoxylin and eosin (H&E) staining of formalin-fixed, paraffin-embedded tissue sections.

Scoring the HER2 protein (IHC): Scoring a sample for HER2 protein using the following FDA criteria for immunohistochemistry (IHC): score 0 (IHC 0), score 1+(IHC 1+), score 2+(IHC 2+), score 3+(IHC 3+). The scoring criteria rely on IHC staining intensities, wherein a IHC 0 indicates no staining above background or negative staining, respectively, IHC 1+ indicates weak intensity staining, IHC 2+ indicates moderate intensity staining, and IHC 3+ indicates strong intensity staining. A skilled person, for example a skilled pathologist, is able to readily identify "weak", "moderate" or "strong" staining, because these terms are general concepts that pathologists apply within the scope of their everyday practice when evaluating IHC stains (see, for example, Bartley et al., J. Clinical Oncology, 2017, 35(4): 446-466; Wolff et al., Arch Pathol Lab Med, Early Online Release, DOI:105858/arpa.2018-0902-SA; Hammond et al., Arch Pathol Lab Med, 2010, 134:907-1101; Wolff et al., J Clin Oncol, 2007, 25:118-145).

In situ hybridization (ISH): A method of determining the presence or distribution of a nucleic acid in a sample using hybridization of a labelled nucleic acid probe to localize a specific DNA or RNA sequence in a portion or section of tissue (in situ), or, if the tissue is small enough (e.g., plant seeds, Drosophila embryos), in the entire tissue (whole mount ISH). DNA ISH can be used to determine the structure of chromosomes, such as for use in medical diagnostics to assess chromosomal integrity and/or to determine gene copy number in a sample. RNA ISH measures and localizes mRNAs and other transcripts within tissue sections or whole mounts, for example, scoring a sample for HER2 RNA using HER2 RNA-ISH+ (HER2 RNA detected) and HER2 RNA-ISH- (no HER2 RNA detected).

For ISH, sample cells and tissues are usually treated to fix the target nucleic acids in place and to increase access of the probe to the target molecule. The detectably labelled probe hybridizes to the target sequence at elevated temperature, and then the excess probe is washed away. Solution parameters, such as temperature, salt and/or detergent concentration, can be manipulated to remove any non-identical interactions (e.g., so only exact sequence matches will remain bound). Then, the labelled probe is localized and potentially quantitated in the tissue using either autoradiography, fluorescence microscopy or immunohistochemistry, respectively. ISH can also use two or more probes, which are typically differently labelled to simultaneously detect two or more nucleic acids.

Dual in situ hybridization (DISH): An in situ hybridization (ISH) method using two probes to detect two different target sequences. Typically, these two probes are differently labelled. In the methods presented herein, DISH may be an assay to determine the HER2 gene amplification status by contacting a sample of a tumor with a HER2-specific probe and a chromosome 17 centromere probe and determining a ratio of HER2 genomic DNA to chromosome 17 centromere DNA (such as a ratio of HER2 gene copy number to chromosome 17 centromere copy number). The method includes utilizing different detectable labels and/or detection systems for each of the HER2 genomic DNA and chromosome 17 centromere DNA, such that each can be individually visually detected in a single sample.

Scoring the HER2 gene (DISH): Scoring a sample for HER2 gene using the following FDA criteria based on the ratio of HER2 genomic DNA to chromosome 17 centromere DNA as determined in a DISH assay: DISH- (negative: HER2/CEN17<2) DISH+ (positive: HER2/CEN172.0).

Probe: An isolated nucleic acid (such as an isolated synthetic oligonucleotide), attached to a detectable label or reporter molecule. Typical labels include radioactive isotopes, enzyme substrates, co-factors, ligands, chemiluminescent or fluorescent agents, haptens (including, but not limited to, DNP), and enzymes. Methods for labelling and guidance in the choice of labels appropriate for various purposes are discussed, e.g., in Sambrook et al. (In Molecular Cloning: A Laboratory Manual, CSHL, New York, 1989) and Ausubel et al. (In Current Protocols in Molecular Biology, Greene Publ. Assoc. and Wiley-Intersciences, 1992).

Probes can be selected to provide a desired specificity, and may comprise at least 15, 20, 25, 30, 35, 40, 45, 50 or more nucleotides of a target nucleic acid. In particular examples, probes can include at least 100, 250, 500, 600, 1000, or more nucleotides of a target nucleic acid. In some examples, the probe includes segments of nucleotides that are from non-contiguous portions of a target nucleic acid, such as a HER2 genomic nucleic acid.

Specific binding: A term that refers to the binding of an agent that preferentially binds to a defined target (such as an antibody to a specific protein or antigen or a nucleic acid probe to a specific nucleic acid sequence). With respect to a target protein, "specifically binds" refers to the preferential association of an antibody or other ligand, in whole or part, with a specific polypeptide. "Specifically binds" refers to the preferential association of a nucleic acid probe, in whole or part, with a specific nucleic acid, when referring to a target nucleic acid.

A specific binding agent binds substantially only to a particular target. A minor amount of non-specific interaction may occur between a specific binding agent and a non-target protein or nucleic acid. Antibody to antigen specific binding typically results in greater than 2-fold, such as greater than 5-fold, greater than 10-fold, or greater than 100-fold increase in amount of bound antibody or other ligand (per unit time) to a target protein, as compared to a non-target protein. Immunoassay formats can be used to select antibodies that specifically react with a particular protein (such as antibodies that specifically bind HER2 protein). See Harlow & Lane, Antibodies, A Laboratory Manual, Cold Spring Harbor Publications, New York (1988), for a description of immunoassay formats and conditions.

Specific binding of a nucleic acid probe to a target nucleic acid molecule typically results in greater than 2-fold, such as greater than 5-fold, greater than 10-fold, or greater than 100-fold increase in amount of bound nucleic acid probe to a target nucleic acid as compared to a non-target nucleic acid. A variety of ISH conditions are appropriate for selecting nucleic acid probes that bind specifically with a particular nucleic acid sequence (such as a HER2-specific probe or a chromosome 17 centromere probe).

Background

Embodiments of the present disclosure include methods of assessing and/or scoring HER2 heterogeneity in solid tumors by analyzing HER2 protein negative regions in tumor samples, once HER2 heterogeneity is identified. For example, HER2 protein negative regions may be excised from tumor samples using automated dissection tools known in the art, as described below.

Disclosed herein are methods for detecting multiple target molecules (such as two or more proteins and/or nucleic acids) in a single sample. In particular embodiments, the methods include detecting presence and/or amount of HER2 protein, HER2 RNA, and HER2 genomic DNA (such as HER2 gene copy number) in a single sample. In some embodiments, the methods further include detecting presence and/or amount of chromosome 17 centromere DNA in the sample, and in some examples, determining a ratio of HER2 genomic DNA to chromosome 17 centromere DNA (such as a ratio of HER2 gene copy number to chromosome 17 centromere copy number). The methods include utilizing different detectable labels and/or detection systems for each of the HER2 protein, HER2 RNA, HER2 genomic DNA, and chromosome 17 centromere DNA (if included), such that each can be individually visually detected in a single sample.

In some embodiments of the methods, a sample may be contacted with an antibody that specifically binds to HER2 protein and HER2 protein may be detected and the sample may be contacted with a nucleic acid probe that specifically binds to HER2 genomic DNA and HER2 genomic DNA may be detected. The detection of HER2 protein and HER2 genomic DNA can be performed concomitantly or sequentially. In one specific embodiment, the method includes sequentially detecting HER2 protein (contacting the sample with a HER2-specific antibody and detecting HER2 protein in the sample), followed by detecting HER2 genomic DNA (contacting the sample with a HER2 genomic DNA-specific nucleic acid probe and detecting HER2 genomic DNA).

In additional embodiments, the method includes simultaneously contacting the sample with a HER2 genomic DNA-specific nucleic acid probe and a chromosome 17 centromere genomic DNA-specific nucleic acid probe and detecting HER2 genomic DNA and then detecting chromosome 17 centromere genomic DNA.

In some examples of the disclosed methods, the sample is contacted with an antibody that specifically binds to HER2 protein. Methods of constructing HER2-specific antibodies are known in the art. In addition, such antibodies may be commercially available. In one specific example, the sample is contacted with an anti-HER2 rabbit monoclonal antibody, such as anti-HER-2/neu (4B5) rabbit monoclonal antibody, which recognizes internal HER2 protein, (Ventana Medical Systems, Inc., Tucson, Ariz., e.g., catalog number 790-2991). Additional HER2-specific antibodies include anti-c-erbB2 antibody A0485 (Dako, Carpinteria, Calif.). In some examples, the HER2-specific antibody is detectably labeled, allowing detection of HER2 protein in the sample. In other examples, after contacting the sample with the anti-HER2 antibody (the primary antibody), the sample is contacted with a detectably labeled secondary antibody raised against the primary antibody, as shown in Table 2, such as a secondary antibody conjugated to an enzyme (for example, alkaline phosphatase (AP) or horseradish peroxidase (HRP)) or a secondary antibody conjugated to a hapten that can be detected with a further reagent conjugated to an enzyme. The presence of HER2 protein is detected by contacting the enzyme with a chromogen and/or substrate composition which produces a colored precipitate in the vicinity of the anti-HER2 antibody. The presence and/or amount of HER2 protein is detected by determining staining intensity in the sample. In some examples, the staining intensity is rated by a slide reader on a numeric scale, such as a scale of 0-3 (for example, where 0 indicates no staining relative to background, 1 indicates weak staining, 2 indicates moderate staining, and 3 indicates strong staining).

In one particular example, the method includes contacting the sample with a primary antibody that specifically binds to the HER2 protein (for example, anti-HER2 4B5 rabbit monoclonal antibody), for example under conditions sufficient for the anti-HER2 antibody to specifically bind to HER2 protein in the sample. The sample is then contacted with a biotinylated secondary antibody that specifically binds the primary antibody, for example under conditions sufficient for the secondary antibody to specifically bind to the primary antibody. The sample is then contacted with HRP-conjugated streptavidin, for example under conditions sufficient for the streptavidin-HRP to specifically bind to the biotin, followed by contacting the sample with hydrogen peroxide substrate and 3,3'-diaminobenzidine (DAB) chromogen, which produces a brown precipitate near the anti-HER2 antibody (and HER2 protein) that can be visually detected by light (bright-field) microscopy. In one example, the reagents (except for the anti-HER2 antibody) are included in a kit, such as the IVIEW DAB Detection Kit (Ventana Medical Systems, Tucson, Ariz., catalog number 760-091), OptiView DAB IHC Detection Kit (Ventana Medical Systems, catalog number 760-700), and ultraView Universal DAB Detection Kit (Ventana Medical Systems, catalog number 760-500). One of ordinary skill in the art can select alternative detection reagents, as shown in Table 1 (such as alternative secondary antibodies, enzymes, substrates, and/or chromogens) including those that produce a different color precipitate for detection of the HER2 protein.

In some examples, of the disclosed methods, the sample is contacted with a nucleic acid probe that specifically binds to HER2 genomic DNA. Methods of constructing HER2-specific nucleic acid probes are known to one of ordinary skill in the art. HER2-specific nucleic acid probes may also be commercially available. For example, a HER2 probe suitable for use in the disclosed methods includes the HER2 probe included in the INFORM HER2 Dual ISH Probe Cocktail (Ventana Medical Systems, Tucson, Ariz., catalog number 780-4422). In one example, the sample is contacted with a hapten-labeled HER2 nucleic acid probe, for example under conditions specific for the probe to specifically bind to (hybridize with) HER2 genomic DNA in the sample. The sample is then contacted with an antibody that specifically binds to the hapten, for example, under conditions sufficient for the antibody to specifically bind to the hapten. The antibody may be conjugated to an enzyme (such as AP or HRP) or alternatively, the sample may be contacted with a second antibody that specifically binds the anti-hapten antibody, where the second antibody is conjugated to an enzyme. The presence of HER2 genomic DNA is detected by contacting the enzyme with a chromogen and/or substrate composition to produce a colored precipitate in the vicinity of the HER2 nucleic acid probe. In some examples, the gene copy number of HER2 DNA in the sample is scored by a slide reader by counting the number of areas of precipitate ("spots") in the nuclei of the tumor cells.

In one particular example, the method includes contacting the sample with a HER2 genomic DNA probe conjugated to dinitrophenyl (DNP), for example under conditions sufficient for the HER2 probe to specifically bind to HER2 genomic DNA in the sample. The sample is then contacted with an anti-hapten antibody that specifically binds DNP, for example under conditions sufficient for the anti-DNP antibody to specifically bind to the DNP. The sample is then contacted with an HRP-conjugated secondary antibody that specifically binds to the anti-DNP antibody, for example under conditions sufficient for the secondary antibody to specifically bind to the anti-DNP antibody. The sample is then contacted with chromogen and substrate silver acetate, hydroquinone, and hydrogen peroxide. The silver ions are reduced by hydroquinone to metallic silver ions which can be visually detected by light microscopy as black spots. In one example, the reagents (except for the HER2 probe) are included in a kit, such as the ULTRAVIEW SISH DNP Detection Kit (Ventana Medical Systems, Tucson, Ariz., catalog number 760-098). One of ordinary skill in the art can select alternative detection reagents, as shown in Table 1, (such as alternative haptens, antibodies, enzymes, substrates, and/or chromogens) including those that produce a different color precipitate for detection of HER2 genomic DNA.

In additional examples, the disclosed methods further include contacting the sample with a probe that specifically binds to chromosome 17 centromere DNA and detecting chromosome 17 DNA (such as chromosome 17 copy number) in the sample. In some examples of the disclosed methods, the sample is contacted with a nucleic acid probe that specifically binds to chromosome 17 centromere DNA. Methods of constructing chromosome 17 centromere-specific nucleic acid probes are known to one of ordinary skill in the art. In addition, chromosome 17 centromere nucleic acid probes may also be commercially available. For example, a chromosome 17 centromere probe suitable for use in the disclosed methods includes the chromosome 17 centromere probe included in the INFORM HER2 Dual ISH Probe Cocktail (Ventana Medical Systems, Tucson, Ariz., catalog number 780-4422). In one example, the sample is contacted with a hapten-labeled chromosome 17 centromere nucleic acid probe, for example under conditions specific for the probe to specifically bind to (hybridize with) chromosome 17 centromere genomic DNA in the sample. The sample is then contacted with an antibody that specifically binds to the hapten, for example, under conditions sufficient for the antibody to specifically bind to the hapten. The antibody may be conjugated to an enzyme (such as AP or HRP) or alternatively, the sample may be contacted with a second antibody that specifically binds the anti-hapten antibody, where the second antibody is conjugated to an enzyme. The presence of chromosome 17 centromere genomic DNA is detected by contacting the enzyme with a chromogen and/or substrate composition to produce a colored precipitate in the vicinity of the chromosome 17 centromere nucleic acid probe. In some examples, the gene copy number of chromosome 17 centromere DNA in the sample is scored by a slide reader by counting the number of areas of precipitate ("spots") in the nuclei of the tumor cells.

In a particular example, the method includes contacting the sample with a chromosome 17 centromere DNA probe conjugated to digoxigenin (DIG), for example under conditions sufficient for the chromosome 17 centromere probe to specifically bind to chromosome 17 centromere DNA in the sample. The sample is then contacted with an anti-hapten antibody that specifically binds DIG, for example under conditions sufficient for the anti-DIG antibody to specifically bind to the DIG. The sample is then contacted with an AP-conjugated secondary antibody that specifically binds to the anti-DIG antibody, for example under conditions sufficient for the secondary antibody to specifically bind to the anti-DIG antibody. The sample is then contacted with a naphthol phosphate and Fast Red, producing a red precipitate which is deposited in the nuclei near the chromosome 17 centromere probe (and the chromosome 17 centromere DNA) and can be visually detected by light microscopy as red spots. In one example, the reagents (except for the chromosome 17 centromere probe) are included in a kit, such as the ULTRAVIEW Red ISH DIG Detection Kit (Ventana Medical Systems, Tucson, Ariz., catalog number 760-505). One of ordinary skill in the art can select alternative detection reagents (such as alternative haptens, antibodies, enzymes, substrates, and/or chromogens) including those that produce a different color precipitate for detection of chromosome 17 centromere DNA.

The disclosed methods are directed to detection of multiple protein and nucleic acid targets in a single sample. As a result, the detectable signal for each member of the assay must be individually distinguishable. Therefore, in some examples, the visual signal generated by the detection assay for each member of the assay is a different color. In one specific example, the methods result in a brown staining for HER2 protein (for example, brown staining at the cell membrane) and black staining for HER2 genomic DNA (for example, black spots in the nucleus, such as individually distinguishable black spots or clusters of black spots). In another specific example, the methods result in a brown staining for HER2 protein and black staining for HER2 genomic DNA. One of ordinary skill in the art can select different combinations of detection reagents to provide different colored staining for each of the HER2 protein and HER2 genomic DNA. In additional examples, the methods further result in red staining for chromosome 17 centromere DNA (for example, red spots in the nucleus, such as individually distinguishable red spots or clusters of red spots). In a particular example, the methods result in brown staining of HER2 protein, purple staining of ER protein, black staining of HER2 genomic DNA, and red staining of chromosome 17 centromere DNA. In some embodiments, HER2 protein staining with DAB (brown) staining is utilized because this is the currently accepted detection system and is familiar to pathologists. However, additional color combinations can be used.

The methods disclosed herein may also include steps for pre-treatment of tissue samples prior to or between the steps including contacting the sample with a HER2-specific antibody, a HER2-specific nucleic acid probe, and/or a chromosome 17 centromere-specific nucleic acid probe. These steps are known to one of ordinary skill in the art and may include deparaffinization of a sample (such as a FFPE sample), cell conditioning, washes, and so on. An exemplary protocol, including such pre-treatment and other steps is provided in Example 1. One of skill in the art can make adjustments to these conditions (for example, minor adjustments to times and/or temperatures of incubations, wash steps, etc.).

Exemplary chromogens that can be used in the disclosed methods include (but are not limited to) those shown in Table 1. While not exhaustive, Table 1 provides insight into the varieties of presently available chromogens. Further illustrative chromogens include those described in U.S. Pat. Publ. 2013/0260379 and WO2015124703, filed Feb. 20, 2015; both of which are incorporated by reference herein in their entirety.

TABLE 1

Chromogenic Detection Reagents

| Abbreviation | Name | Color | Enzyme |
| --- | --- | --- | --- |
| DAB | 3,3'-diamino-benzidine + $H_2O_2$ | Brown-black | Peroxidase |
| AEC | 3-amino-9-ethyl-carbazole + $H_2O_2$ | Red | Peroxidase |
| CN | 4-chloro-1-naphthol + $H_2O_2$ | Blue | Peroxidase |
| BCIP/NBT | 5-bromo-4-chloro-3-indolyl-phosphate + nitroblue tetrazolium | Indigo-black | Alkaline phosphatase |
| FAST RED | 4-chloro-2-methylbenzenediazonium + 3-hydroxy-2-naphthoic acid 2,4-dimethylanilide phosphate | Red | Alkaline phosphatase |
| FAST BLUE | Napthol AS-MX phosphate disodium salt + fast blue BB salt hemi(zinc chloride) salt | Blue | Alkaline phosphatase |
| Fuchsin | Naphthol AS-BI + New Fuchsin | red | Alkaline phosphatase |
| NBT | Nitroblue tetrazolium + phenazine methosulfate | Blue-purple | Dehydrogenase |
| ALK GOLD | 3-methyl-1-phenyl-1H-pyrazol-5-yl dihydrogen phosphate + fast blue BB | Yellow-gold | Alkaline phosphatase |

In some embodiments, the methods include determining whether the sample is positive or negative for HER2. In some examples, the sample is determined to be positive or negative for HER2 protein, positive or negative for HER2 gene amplification, or both. One of ordinary skill in the art can determine whether a sample (such as a breast tumor sample) is positive or negative for HER2 protein and/or HER2 gene amplification. In some examples, the sample is scored semi-quantitatively for HER2 protein, such as 0 (negative), 1+(negative), 2+(equivocal), or 3+(positive). In some examples, the sample is scored for HER2 gene amplification based on HER2 gene copy number, such as six or more copies of HER2 (positive) or fewer than six copies of HER2 (negative). In other examples, the sample is scored for HER2 gene amplification based on the ratio of HER2 gene copy number to chromosome 17 centromere copy number, such as HER2/CEN17<1.8 (negative), 1.8HER2/CEN172.2 (equivocal), HER2/CEN17>2.2 (positive). Additional HER2 test guidelines are available and include those described in Wolff et al., J. Clin. Oncol., doi: 10.1200/JCO.2013.50.9984.

In some embodiments, the methods also include determining whether the sample is positive or negative for HER2 RNA. One of ordinary skill in the art can determine whether a sample (such as a gastric tumor sample) is positive or negative for HER2 RNA.

The disclosed methods can be automated (for example, as described in Example 1). Systems for automated IHC and/or ISH are commercially available, such as the VENTANA BENCHMARK ULTRA slide staining system, the BENCHMARK XT slide staining system, and the DISCOVERY XT slide staining system (Ventana Medical Systems, Tucson, Ariz.), BOND-MAX and BOND-III slide stainers (Leica Biosystems, Buffalo Grove, Ill.), and the IQ Kinetic slide stainer (Biocare Medical, Concord, Calif.). Ventana Medical Systems, Inc. is the assignee of a number of United States patents disclosing systems and methods for performing automated analyses, including U.S. Pat. Nos. 5,650,327; 5,654,200; 6,296,809; 6,352,861; 6,582,962; 6,827,901 and 6,943,029, each of which is incorporated herein by reference.

Histochemical Staining of Samples

In some embodiments, the samples analyzed are histochemically-stained tissue sections. Sections of the samples are stained by applying a panel of one or more biomarker-specific reagents in combination with a set of appropriate detection reagents to generate a biomarker-stained section. Biomarker staining is typically accomplished by contacting a section of the sample with a biomarker-specific reagent under conditions that facilitate specific binding between the biomarker and the biomarker-specific reagent. The sample is then contacted with a set of detection reagents that interact with the biomarker-specific reagent to facilitate deposition a detectable moiety in close proximity the biomarker, thereby generating a detectable signal localized to the biomarker. Typically, wash steps are performed between application of different reagents to prevent unwanted non-specific staining of tissues. Where multiple biomarkers are being evaluated, a single serial section may be stained for each biomarker in a simplex staining scheme, or one or more serial sections may be stained for a plurality of the biomarkers in a multiplex staining scheme, or a combination of both simplex and multiplex stains. Biomarker-stained sections may optionally be additionally stained with a contrast agent (such as a hematoxylin stain) to visualize macromolecular structures. Additionally, a serial section of the biomarker-stained section may be stained with a morphological stain to facilitate ROI identification.

Histochemical staining can include contacting a sample with a biomarker-specific reagent that specifically binds to HER2 protein and facilitates detection of HER2 protein in the sample, contacting the sample with a first nucleic acid probe that specifically binds HER2 genomic DNA and facilitates detection of HER2 gene amplification status in the sample, and/or contacting the sample with a second nucleic acid probe that specifically binds HER2 RNA and facilitates detection of HER2 RNA status in the sample. The histochemical staining can be used in scoring the sample for HER2 protein (e.g., IHC 0, 1+, 2+, 3+), HER2 gene (e.g., DISH +/−), and HER2 RNA (e.g., RNA-ISH +/−), as described above. In an embodiment, the scoring is performed using an image analysis system. In an embodiment, the scoring is performed without the use of an image analysis system.

Labeling Schemes and Associated Reagents

The biomarker-specific reagent facilitates detection of the biomarker by mediating deposition of a detectable moiety in close proximity to the biomarker-specific reagent.

In some embodiments, the detectable moiety is directly conjugated to the biomarker-specific reagent, and thus is deposited on the sample upon binding of the biomarker-specific reagent to its target (generally referred to as a direct labeling method). Direct labeling methods are often more directly quantifiable, but often suffer from a lack of sensitivity. In other embodiments, deposition of the detectable moiety is affected by the use of a detection reagent associated with the biomarker-specific reagent (generally referred to as an indirect labeling method). Indirect labeling methods have the increase the number of detectable moieties that can be deposited in proximity to the biomarker-specific reagent, and thus are often more sensitive than direct labeling methods, particularly when used in combination with dyes.

In some embodiments, an indirect method is used, wherein the detectable moiety is deposited via an enzymatic reaction localized to the biomarker-specific reagent. Suitable enzymes for such reactions are well-known and include, but are not limited to, oxidoreductases, hydrolases, and peroxidases. Specific enzymes explicitly included are horseradish peroxidase (HRP), alkaline phosphatase (AP), acid phosphatase, glucose oxidase, β-galactosidase, β-glucuronidase, and β-lactamase. The enzyme may be directly conjugated to the biomarker-specific reagent, or may be indirectly associated with the biomarker-specific reagent via a labeling conjugate. As used herein, a "labeling conjugate" includes:

(a) a specific detection reagent; and
(b) an enzyme conjugated to the specific detection reagent, wherein the enzyme is reactive with the chromogenic substrate, signaling conjugate, or enzyme-reactive dye under appropriate reaction conditions to effect in situ generation of the dye and/or deposition of the dye on the tissue sample.

In non-limiting examples, the specific detection reagent of the labeling conjugate may be a secondary detection reagent (such as a species-specific secondary antibody bound to a primary antibody, an anti-hapten antibody bound to a hapten-conjugated primary antibody, or a biotin-binding protein bound to a biotinylated primary antibody), a tertiary detection reagent (such as a species-specific tertiary antibody bound to a secondary antibody, an anti-hapten antibody bound to a hapten-conjugated secondary antibody, or a biotin-binding protein bound to a biotinylated secondary antibody), or other such arrangements. An enzyme thus localized to the sample-bound biomarker-specific reagent can then be used in a number of schemes to deposit a detectable moiety.

In some cases, the enzyme reacts with a chromogenic compound/substrate. Particular non-limiting examples of chromogenic compounds/substrates include 4-nitrophenylphospate (pNPP), fast red, bromochloroindolyl phosphate (BCIP), nitro blue tetrazolium (NBT), BCIP/NBT, fast red, AP Orange, AP blue, tetramethylbenzidine (TMB), 2,2'-azino-di-[3-ethylbenzothiazoline sulphonate] (ABTS), o-dianisidine, 4-chloronaphthol (4-CN), nitrophenyl-β-D-galactopyranoside (ONPG), o-phenylenediamine (OPD), 5-bromo-4-chloro-3-indolyl-β-galactopyranoside (X-Gal), methylumbelliferyl-β-D-galactopyranoside (MU-Gal), p-nitrophenyl-α-D-galactopyranoside (PNP), 5-bromo-4-chloro-3-indolyl-β-D-glucuronide (X-Gluc), 3-amino-9-ethyl carbazol (AEC), fuchsin, iodonitrotetrazolium (INT), tetrazolium blue, or tetrazolium violet.

In some embodiments, the enzyme can be used in a metallographic detection scheme. Metallographic detection methods include using an enzyme such as alkaline phosphatase in combination with a water-soluble metal ion and a redox-inactive substrate of the enzyme. In some embodiments, the substrate is converted to a redox-active agent by the enzyme, and the redox-active agent reduces the metal ion, causing it to form a detectable precipitate. (see, for example, U.S. Patent application Ser. No. 11/015,646, filed Dec. 20, 2004, PCT Publication No. 2005/003777 and U.S. Patent Application Publication No. 2004/0265922; each of which is incorporated by reference herein in its entirety). Metallographic detection methods include using an oxidoreductase enzyme (such as horseradish peroxidase) along with a water-soluble metal ion, an oxidizing agent and a reducing agent, again to for form a detectable precipitate. (See, for example, U.S. Pat. No. 6,670,113, which is incorporated by reference herein in its entirety).

In some embodiments, the enzymatic action occurs between the enzyme and the dye itself, wherein the reaction converts the dye from a non-binding species to a species deposited on the sample. For example, reaction of DAB with a peroxidase (such as horseradish peroxidase) oxidizes the DAB, causing it to precipitate.

In yet other embodiments, the detectable moiety is deposited via a signaling conjugate comprising a latent reactive moiety configured to react with the enzyme to form a reactive species that can bind to the sample or to other detection components. These reactive species are capable of reacting with the sample proximal to their generation, i.e. near the enzyme, but rapidly convert to a non-reactive species so that the signaling conjugate is not deposited at sites distal from the site at which the enzyme is deposited. Examples of latent reactive moieties include: quinone methide (QM) analogs, such as those described at WO2015124703A1, and tyramide conjugates, such as those described at, WO2012003476A2, each of which is hereby incorporated by reference herein in its entirety. In some examples, the latent reactive moiety is directly conjugated to a dye, such as N,N'-biscarboxypentyl-5,5'-disulfonato-indodicarbocyanine (Cy5), 4-(dimethylamino) azobenzene-4'-sulfonamide (DABSYL), tetramethylrhodamine (DISCO Purple), and Rhodamine 110 (Rhodamine). In other examples, the latent reactive moiety is conjugated to one member of a specific binding pair, and the dye is linked to the other member of the specific binding pair. In other examples, the latent reactive moiety is linked to one member of a specific binding pair, and an enzyme is linked to the other member of the specific binding pair, wherein the enzyme is (a) reactive with a chromogenic substrate to effect generation of the dye, or (b) reactive with a dye to effect deposition of the dye (such as DAB). Examples of specific binding pairs include:

(1) a biotin or a biotin derivative (such as desthiobiotin) linked to the latent reactive moiety, and a biotin-binding entity (such as avidin, streptavidin, deglycosylated avidin (such as NEUTRAVIDIN), or a biotin binding protein having a nitrated tyrosine at its biotin binding site (such as CAPTAVIDIN)) linked to a dye or to an enzyme reactive with a chromogenic substrate or reactive with a dye (for example, a peroxidase linked to the biotin-binding protein when the dye is DAB); and (2) a hapten linked to the latent reactive moiety, and an anti-hapten antibody linked to a dye or to an enzyme reactive with a chromogenic substrate or reactive with a dye (for example, a peroxidase linked to the biotin-binding protein when the dye is DAB).

Non-limiting examples of biomarker-specific reagent and detection reagent combinations are set forth in Table 2 are specifically included.

TABLE 2

A. Biomarker-specific reagent linked directly to detectable moiety
Biomarker-specific reagent-Dye conjugate
B. Biomarker-specific reagent linked to enzyme reacting with detectable moiety
Biomarker-specific reagent-Enzyme conjugate + DAB
Biomarker-specific reagent-Enzyme conjugate + Chromogen
C. Biomarker-specific reagent linked to Enzyme reacting with detectable moiety

| | |
|---|---|
| C1. Signaling conjugate comprises detectable moiety | Biomarker-specific reagent-Enzyme conjugate + QM-Dye conjugate |
| | Biomarker-specific reagent-Enzyme conjugate + Tyramide-Dye conjugate |
| C2. Signaling conjugate comprises enzyme that reacts directly with detectable moiety | Biomarker-specific reagent-Enzyme conjugate + QM-Enzyme conjugate + DAB |
| | Biomarker-specific reagent-Enzyme conjugate + QM-Enzyme conjugate + Chromogen |
| | Biomarker-specific reagent-Enzyme conjugate + Tyramide-Enzyme conjugate + DAB |
| | Biomarker-specific reagent-Enzyme conjugate + Tyramide-Enzyme conjugate + Chromogen |
| C3. Signaling conjugate comprises enzyme that reacts with second signaling conjugate comprising detectable moiety | Biomarker-specific reagent-Enzyme conjugate + QM-Enzyme conjugate + QM-Dye conjugate |
| | Biomarker-specific reagent-Enzyme conjugate + QM-Enzyme conjugate + Tyramide-Dye conjugate |
| | Biomarker-specific reagent-Enzyme conjugate + Tyramide-Enzyme conjugate + QM-Dye conjugate |
| | Biomarker-specific reagent-Enzyme conjugate + Tyramide-Enzyme conjugate + Tyramide-Dye conjugate |
| C4. Signaling conjugate comprises member of a specific binding pair and other member of binding pair is linked to detectable moiety | Biomarker-specific reagent-Enzyme conjugate + Tyramide-(biotin/hapten) conjugate + Dye-(avidin/anti-hapten biomarker-specific reagent) conjugate |
| | Biomarker-specific reagent-Enzyme conjugate + QM-(biotin/hapten) conjugate + Dye-(avidin/anti-hapten biomarker-specific reagent) conjugate |
| C5. Signaling conjugate comprises member of a specific binding pair and other member of binding pair is linked to enzyme reactive with detectable moiety | Biomarker-specific reagent-Enzyme conjugate + QM-(biotin/hapten) conjugate + Enzyme-(avidin/anti-hapten biomarker-specific reagent) conjugate + DAB |
| | Biomarker-specific reagent-Enzyme conjugate + QM-(biotin/hapten) conjugate + Enzyme-(avidin/anti-hapten biomarker-specific reagent) conjugate + Chromogen |
| | Biomarker-specific reagent-Enzyme conjugate + Tyramide-(biotin/hapten) conjugate + Enzyme-(avidin/anti-hapten biomarker-specific reagent) conjugate + DAB |
| | Biomarker-specific reagent-Enzyme conjugate + Tyramide-(biotin/hapten) conjugate + Enzyme-(avidin/anti-hapten biomarker-specific reagent) conjugate + Chromogen |
| C6. Signaling conjugate comprises member of a specific binding pair and other member of binding pair is linked to enzyme reactive with second detectable moiety linked to a detectable moiety | Biomarker-specific reagent-Enzyme conjugate + QM-(biotin/hapten) conjugate + Enzyme-(avidin/anti-hapten biomarker-specific reagent) conjugate + Tyramide-Dye conjugate |
| | Biomarker-specific reagent-Enzyme conjugate + QM-(biotin/hapten) conjugate + Enzyme-(avidin/anti-hapten biomarker-specific reagent) conjugate + QM-Dye conjugate |
| | Biomarker-specific reagent-Enzyme conjugate + Tyramide-(biotin/hapten) conjugate + Enzyme-(avidin/anti-hapten biomarker-specific reagent) conjugate + Tyramide-Dye conjugate |

TABLE 2-continued

| | |
|---|---|
| | Biomarker-specific reagent-Enzyme conjugate + Tyramide-(biotin/hapten) conjugate + Enzyme-(avidin/anti-hapten biomarker-specific reagent) conjugate + QM-Dye conjugate |
| D. Biomarker-specific reagent linked to member of specific binding pair | |
| D1. Dye linked to other member of specific binding pair | Biomarker-specific reagent-(biotin/hapten) conjugate + Dye-(avidin/anti-hapten biomarker-specific reagent) conjugate |
| D2. Enzyme linked to other member of specific binding pair, wherein the enzyme is reactive with detectable moiety | Biomarker-specific reagent-(biotin/hapten) conjugate + Enzyme-(avidin/anti-hapten biomarker-specific reagent) conjugate + DAB<br>Biomarker-specific reagent-(biotin/hapten) conjugate + Enzyme-(avidin/anti-hapten biomarker-specific reagent) conjugate + Chromogen<br>Biomarker-specific reagent-(biotin/hapten) conjugate + Enzyme-(avidin/anti-hapten biomarker-specific reagent) conjugate + QM-Dye conjugate<br>Biomarker-specific reagent-(biotin/hapten) conjugate + Enzyme-(avidin/anti-hapten biomarker-specific reagent) conjugate + Tyramide-Dye conjugate |
| E. Secondary detection reagent linked directly to detectable moiety | |
| Biomarker-specific reagent + 2° specific detection reagent-Dye conjugate | |
| F. Secondary detection reagent linked to Enzyme reacting with detectable moiety | |
| Biomarker-specific reagent + 2° specific detection reagent-Enzyme conjugate + DAB | |
| Biomarker-specific reagent + 2° specific detection reagent-Enzyme conjugate + Chromogen | |
| G. Secondary detection reagent linked to Enzyme reacting with detectable moiety | |
| G1. Signaling conjugate comprises detectable moiety | Biomarker-specific reagent + 2° specific detection reagent-Enzyme conjugate + QM-Dye conjugate<br>Biomarker-specific reagent + 2° specific detection reagent-Enzyme conjugate + Tyramide-Dye conjugate |
| G2. Signaling conjugate comprises enzyme that reacts directly with detectable moiety | Biomarker-specific reagent + 2° specific detection reagent-Enzyme conjugate + QM-Enzyme conjugate + DAB<br>Biomarker-specific reagent + 2° specific detection reagent-Enzyme conjugate + QM-Enzyme conjugate + Chromogen<br>Biomarker-specific reagent + 2° specific detection reagent-Enzyme conjugate + Tyramide-Enzyme conjugate + DAB<br>Biomarker-specific reagent + 2° specific detection reagent-Enzyme conjugate + Tyramide-Enzyme conjugate + Chromogen |
| G3. Signaling conjugate comprises enzyme that reacts with second signaling conjugate comprising detectable moiety | Biomarker-specific reagent + 2° specific detection reagent-Enzyme conjugate + QM-Enzyme conjugate + QM-Dye conjugate<br>Biomarker-specific reagent + 2° specific detection reagent-Enzyme conjugate + QM-Enzyme conjugate + Tyramide-Dye conjugate<br>Biomarker-specific reagent + 2° specific detection reagent-Enzyme conjugate + Tyramide-Enzyme conjugate + QM-Dye conjugate<br>Biomarker-specific reagent + 2° specific detection reagent-Enzyme conjugate + Tyramide-Enzyme conjugate + Tyramide-Dye conjugate |
| G4. Signaling conjugate comprises member of a specific binding pair and other member of binding pair is linked to detectable moiety | Biomarker-specific reagent + 2° specific detection reagent-Enzyme conjugate + Tyramide-(biotin/hapten) conjugate + Dye-(avidin/anti-hapten biomarker-specific reagent) conjugate<br>Biomarker-specific reagent + 2° specific detection reagent-Enzyme conjugate + QM-(biotin/hapten) conjugate + Dye-(avidin/anti-hapten biomarker-specific reagent) conjugate |
| G5. Signaling conjugate comprises member of a specific binding pair and other member of binding pair is linked to enzyme reactive with detectable moiety | Biomarker-specific reagent + 2° specific detection reagent-Enzyme conjugate + QM-(biotin/hapten) conjugate + Enzyme-(avidin/anti-hapten biomarker-specific reagent) conjugate + DAB<br>Biomarker-specific reagent + 2° specific detection reagent-Enzyme conjugate + QM-(biotin/hapten) conjugate + Enzyme-(avidin/anti-hapten biomarker-specific reagent) conjugate + Chromogen<br>Biomarker-specific reagent + 2° specific detection reagent-Enzyme conjugate + Tyramide-(biotin/hapten) conjugate + Enzyme-(avidin/anti-hapten biomarker-specific reagent) conjugate + DAB |

TABLE 2-continued

| | |
|---|---|
| | Biomarker-specific reagent + 2° specific detection reagent-Enzyme conjugate + Tyramide-(biotin/hapten) conjugate + Enzyme-(avidin/anti-hapten biomarker-specific reagent) conjugate + Chromogen |
| G6. Signaling conjugate comprises member of a specific binding pair and other member of binding pair is linked to enzyme reactive with second detectable moiety linked to a detectable moiety | Biomarker-specific reagent + 2° specific detection reagent-Enzyme conjugate + QM-(biotin/hapten) conjugate + Enzyme-(avidin/anti-hapten biomarker-specific reagent) conjugate + Tyramide-Dye conjugate |
| | Biomarker-specific reagent + 2° specific detection reagent-Enzyme conjugate + QM-(biotin/hapten) conjugate + Enzyme-(avidin/anti-hapten biomarker-specific reagent) conjugate + QM-Dye conjugate |
| | Biomarker-specific reagent + 2° specific detection reagent-Enzyme conjugate + Tyramide-(biotin/hapten) conjugate + Enzyme-(avidin/anti-hapten biomarker-specific reagent) conjugate + Tyramide-Dye conjugate |
| | Biomarker-specific reagent + 2° detection reagent-Enzyme conjugate + Tyramide-(biotin/hapten) conjugate + Enzyme-(avidin/anti-hapten biomarker-specific reagent) conjugate + QM-Dye conjugate |
| H. Secondary detection reagent linked to member of specific binding pair | |
| H1. Dye linked to other member of specific binding pair | Biomarker-specific reagent + 2° specific detection reagent-(biotin/hapten) conjugate + Dye-(avidin/anti-hapten biomarker-specific reagent) conjugate |
| H2. Enzyme linked to other member of specific binding pair, wherein the enzyme is reactive with detectable moiety | Biomarker-specific reagent + 2° specific detection reagent-(biotin/hapten) conjugate + Enzyme-(avidin/anti-hapten biomarker-specific reagent) conjugate + DAB |
| | Biomarker-specific reagent + 2° specific detection reagent-(biotin/hapten) conjugate + Enzyme-(avidin/anti-hapten biomarker-specific reagent) conjugate + Chromogen |
| | Biomarker-specific reagent + 2° specific detection reagent-(biotin/hapten) conjugate + Enzyme-(avidin/anti-hapten biomarker-specific reagent) conjugate + QM-Dye conjugate |
| | Biomarker-specific reagent + 2° specific detection reagent-(biotin/hapten) conjugate + Enzyme-(avidin/anti-hapten biomarker-specific reagent) conjugate + Tyramide-Dye conjugate |
| I. Tertiary specific detection reagent linked directly to detectable moiety | |
| Biomarker-specific reagent + 2° specific detection reagent + 3° specific detection reagent-Dye conjugate | |
| J. Tertiary specific detection reagent linked to Enzyme reacting with detectable moiety | |
| Biomarker-specific reagent + 2° specific detection reagent + 3° specific detection reagent-Enzyme conjugate + DAB | |
| Biomarker-specific reagent + 2° specific detection reagent + 3° specific detection reagent-Enzyme conjugate + Chromogen | |
| K. Tertiary specific detection reagent linked to Enzyme reacting with detectable moiety | |
| K1. Signaling conjugate comprises detectable moiety | Biomarker-specific reagent + 2° specific detection reagent + 3° specific detection reagent-Enzyme conjugate + QM-Dye conjugate |
| | Biomarker-specific reagent + 2° specific detection reagent + 3° specific detection reagent-Enzyme conjugate + Tyramide-Dye conjugate |
| K2. Signaling conjugate comprises enzyme that reacts directly with detectable moiety | Biomarker-specific reagent + 2° specific detection reagent + 3° specificdetection reagent-Enzyme conjugate + QM-Enzyme conjugate + DAB |
| | Biomarker-specific reagent + 2° specific detection reagent + 3° specific detection reagent-Enzyme conjugate + QM-Enzyme conjugate + Chromogen |
| | Biomarker-specific reagent + 2° specific detection reagent + 3° specific detection reagent-Enzyme conjugate + Tyramide-Enzyme conjugate + DAB |
| | Biomarker-specific reagent + 2° specific detection reagent + 3° specific detection reagent-Enzyme conjugate + Tyramide-Enzyme conjugate + Chromogen |
| K3. Signaling conjugate comprises enzyme that reacts with second signaling conjugate comprising detectable moiety | Biomarker-specific reagent + 2° detection reagent + 3° specific detection reagent-Enzyme conjugate + QM-Enzyme conjugate + QM-Dye conjugate |
| | Biomarker-specific reagent + 2° specific detection reagent + 3° specific detection reagent-Enzyme conjugate + QM-Enzyme conjugate + Tyramide-Dye conjugate |
| | Biomarker-specific reagent + 2° specific detection reagent + 3° specificdetection reagent-Enzyme |

TABLE 2-continued

| | |
|---|---|
| | conjugate + Tyramide-Enzyme conjugate + QM-Dye conjugate<br>Biomarker-specific reagent + 2° specific detection reagent + 3° specific detection reagent-Enzyme conjugate + Tyramide-Enzyme conjugate + Tyramide-Dye conjugate |
| K4. Signaling conjugate comprises member of a specific binding pair and other member of binding pair is linked to detectable moiety | Biomarker-specific reagent + 2° specific detection reagent + 3° specificdetection reagent-Enzyme conjugate + Tyramide-(biotin/hapten) conjugate + Dye-(avidin/anti-hapten biomarker-specific reagent) conjugate<br>Biomarker-specific reagent + 2° specific detection reagent + 3° specific detection reagent-Enzyme conjugate + QM-(biotin/hapten) conjugate + Dye-(avidin/anti-hapten biomarker-specific reagent) conjugate |
| K5. Signaling conjugate comprises member of a specific binding pair and other member of binding pair is linked to enzyme reactive with detectable moiety | Biomarker-specific reagent + 2° specific detection reagent + 3° specific detection reagent-Enzyme conjugate + QM-(biotin/hapten) conjugate + Enzyme-(avidin/anti-hapten biomarker-specific reagent) conjugate + DAB<br>Biomarker-specific reagent + 2° specific detection reagent + 3° specific detection reagent-Enzyme conjugate + QM-(biotin/hapten) conjugate + Enzyme-(avidin/anti-hapten biomarker-specific reagent) conjugate + Chromogen<br>Biomarker-specific reagent + 2° specific detection reagent + 3° specific detection reagent-Enzyme conjugate + Tyramide-(biotin/hapten) conjugate + Enzyme-(avidin/anti-hapten biomarker-specific reagent) conjugate + DAB<br>Biomarker-specific reagent + 2° specific detection reagent + 3° specific detection reagent-Enzyme conjugate + Tyramide-(biotin/hapten) conjugate + Enzyme-(avidin/anti-hapten biomarker-specific reagent) conjugate + Chromogen |
| K6. Signaling conjugate comprises member of a specific binding pair and other member of binding pair is linked to enzyme reactive with second detectable moiety linked to a detectable moiety | Biomarker-specific reagent + 2° specific detection reagent + 3° specific detection reagent-Enzyme conjugate + QM-(biotin/hapten) conjugate + Enzyme-(avidin/anti-hapten biomarker-specific reagent) conjugate + Tyramide-Dye conjugate<br>Biomarker-specific reagent + 2° specific detection reagent + 3° specific detection reagent-Enzyme conjugate + QM-(biotin/hapten) conjugate + Enzyme-(avidin/anti-hapten biomarker-specific reagent) conjugate + QM-Dye conjugate<br>Biomarker-specific reagent + 2° specific detection reagent + 3° specific detection reagent-Enzyme conjugate + Tyramide-(biotin/hapten) conjugate + Enzyme-(avidin/anti-hapten biomarker-specific reagent) conjugate + Tyramide-Dye conjugate<br>Biomarker-specific reagent + 2° specific detection reagent + 3° specific detection reagent-Enzyme conjugate + Tyramide-(biotin/hapten) conjugate + Enzyme-(avidin/anti-hapten biomarker-specific reagent) conjugate + QM-Dye conjugate |
| L. Tertiary specific detection reagent linked to member of specific binding pair | |
| L1. Dye linked to other member of specific binding pair | Biomarker-specific reagent + 2° specific detection reagent + 3° specific detection reagent-(biotin/hapten) conjugate + Dye-(avidin/anti-hapten biomarker-specific reagent) conjugate |
| L2. Enzyme linked to other member of specific binding pair, wherein the enzyme is reactive with detectable moiety | Biomarker-specific reagent + 2° specific detection reagent + 3° specific detection reagent-(biotin/hapten) conjugate + Enzyme-(avidin/anti-hapten biomarker-specific reagent) conjugate + DAB<br>Biomarker-specific reagent + 2° specific detection reagent + 3° specific detection reagent-(biotin/hapten) conjugate + Enzyme-(avidin/anti-hapten biomarker-specific reagent) conjugate + Chromogen<br>Biomarker-specific reagent + 2° specific detection reagent + 3° specific detection reagent-(biotin/hapten) conjugate + Enzyme-(avidin/anti-hapten biomarker-specific reagent) conjugate + QM-Dye conjugate<br>Biomarker-specific reagent + 2° specific detection reagent + 3° specific detection reagent-(biotin/hapten) conjugate + Enzyme-(avidin/anti-hapten biomarker-specific reagent) conjugate + Tyramide-Dye conjugate |

In a specific embodiment, the biomarker-specific reagents set forth in Table 2 are antibodies for detection of protein and nucleic acid-probes for detection of mRNA. In some embodiments, the biomarker-specific reagent for detection of mRNA is a combination of a nucleic acid probe labelled with a hapten or epitope tag and an anti-hapten or anti-tag antibody.

Non-limiting examples of commercially available detection reagents or kits comprising detection reagents suitable for use with present methods include: VENTANA ultraView detection systems (secondary antibodies conjugated to enzymes, including HRP and AP); VENTANA iVIEW detection systems (biotinylated anti-species secondary antibodies and streptavidin-conjugated enzymes); VENTANA OptiView detection systems (OptiView) (anti-species secondary antibody conjugated to a hapten and an anti-hapten tertiary antibody conjugated to an enzyme multimer); VENTANA Amplification kit (unconjugated secondary antibodies, which can be used with any of the foregoing VENTANA detection systems to amplify the number of enzymes deposited at the site of primary antibody binding); VENTANA OptiView Amplification system (Anti-species secondary antibody conjugated to a hapten, an anti-hapten tertiary antibody conjugated to an enzyme multimer, and a tyramide conjugated to the same hapten. In use, the secondary antibody is contacted with the sample to effect binding to the primary antibody. Then the sample is incubated with the anti-hapten antibody to effect association of the enzyme to the secondary antibody. The sample is then incubated with the tyramide to effect deposition of additional hapten molecules. The sample is then incubated again with the anti-hapten antibody to effect deposition of additional enzyme molecules. The sample is then incubated with the detectable moiety to effect dye deposition); VENTANA DISCOVERY, DISCOVERY OmniMap, DISCOVERY UltraMap anti-hapten antibody, secondary antibody, chromogen, fluorophore, and dye kits, each of which are available from Ventana Medical Systems, Inc. (Tucson, Arizona); PowerVision and PowerVision+ IHC Detection Systems (secondary antibodies directly polymerized with HRP or AP into compact polymers bearing a high ratio of enzymes to antibodies); and DAKO EnVision™+ System (enzyme labeled polymer that is conjugated to secondary antibodies). In some embodiments, the foregoing detection systems may be used in ISH procedures, wherein the ISH probe bears a hapten or other epitope tag, and wherein the primary antibody is an anti-hapten or anti-tag antibody.

Multiplex Labeling Schemes

In some embodiments, the biomarker-specific reagents and detection reagents are applied in a multiplex staining method. In multiplex methods, the biomarker-specific reagents and detection reagents must be applied in a manner that allows the different biomarkers to be differentially labeled.

One way to accomplish differential labelling of different biomarkers is to select combinations of biomarker-specific reagents, detection reagents, and enzyme combinations that will not result in off-target cross-reactivity between different antibodies or detection reagents (termed "combination staining"). For example, where secondary detection reagents are used, each secondary detection reagent is capable of binding to only one of the primary antibodies used on the section. For example, primary antibodies could be selected that are derived from different animal species (such as mouse, rabbit, rat, and got antibodies), in which case species-specific secondary antibodies may be used. As another example, each primary antibody may include a different hapten or epitope tag, and the secondary antibodies are selected to specifically bind to the hapten or epitope tag. Additionally, each set of detection reagents should be adapted to deposit a different detectable entity on the section, such as by depositing a different enzyme in proximity to each biomarker-specific reagent. An example of such an arrangement is shown at U.S. Pat. No. 8,603,765. Such arrangements have the potential advantage of being able to have each set of biomarker-specific reagents and associated specific binding reagents present on the sample at the same time and/or to perform staining with cocktails of biomarker-specific reagents and detection reagents, thereby reducing the number of staining steps. However, such arrangements may not always be feasible, as reagents may cross-react with different enzymes, and the various detection reagents may cross-react with one another, leading to aberrant staining.

Another way to accomplish differential labelling of different biomarkers is to sequentially stain the sample for each biomarker. In such an embodiment, a first biomarker-specific reagent is reacted with the section, followed by a secondary detection reagent to the first biomarker-specific reagent and other detection reagents resulting in deposition of a first detectable entity. The section is then treated to remove the biomarker-specific reagents and associated detection reagents from the section while leaving the deposited stain in place. The process is repeated for subsequent biomarker-specific reagent. Examples of methods for removing the biomarker-specific reagents and associated detection reagents include heating the sample in the presence of a buffer that elutes the antibodies from the sample (termed a "heat-kill method"), such as those disclosed by Stack et al., Multiplexed immunohistochemistry, imaging, and quantitation: A review, with an assessment of Tyramide signal amplification, multispectral imaging and multiplex analysis, Methods, Vol. 70, Issue 1, pp 46-58 (November 2014), and PCT/EP2016/057955, the contents of which are incorporated by reference.

As will be appreciated by the skilled artisan, combination staining and sequential staining methods may be combined. For example, where only a subset of the primary antibodies is compatible with combination staining, the sequential staining method can be modified, wherein the antibodies compatible with combination staining are applied to the sample using a combination staining method, and the remaining antibodies are applied using a sequential staining method.

Counterstaining

If desired, the biomarker-stained slides may be counterstained to assist in identifying morphologically relevant areas for identifying ROIs, either manually or automatically. Examples of counterstains include chromogenic nuclear counterstains, such as hematoxylin (stains from blue to violet), Methylene blue (stains blue), toluidine blue (stains nuclei deep blue and polysaccharides pink to red), nuclear fast red (also called Kernechtrot dye, stains red), and methyl green (stains green); non-nuclear chromogenic stains, such as eosin (stains pink); fluorescent nuclear stains, including 4', 6-diamino-2-pheylindole (DAPI, stains blue), propidium iodide (stains red), Hoechst stain (stains blue), nuclear green DCS1 (stains green), nuclear yellow (Hoechst S769121, stains yellow under neutral pH and stains blue under acidic pH), DRAQ5 (stains red), DRAQ7 (stains red); fluorescent non-nuclear stains, such as fluorophore-labelled phalloidin, (stains filamentous actin, color depends on conjugated fluorophore). Many automated IHC/ISH slide stainers are also adapted to perform counterstaining.

Morphological Staining of Samples

In certain embodiments, it is also desirable to morphologically stain a serial section of the biomarker-stained section(s). This section can be used to perform primary diagnosis, identify ROIs for digital analysis, etc. Basic morpohological staining techniques often rely on staining nuclear structures with a first dye, and staining cytoplasmic structures with a second stain. Many morphological stains are known, including but not limited to, hematoxylin and eosin (H&E) stain and Lee's Stain (Methylene Blue and Basic Fuchsin). In a specific embodiment, at least one serial section of each biomarker-stained slide is H&E stained. Any method of applying H&E stain may be used, including manual and automated methods. In an embodiment, at least one section of the sample is an H&E stained sampled stained on an automated staining system. Automated systems for performing H&E staining typically operate on one of two staining principles: batch staining (also referred to as "dip 'n dunk") or individual slide staining. Batch stainers generally use vats or baths of reagents in which many slides are immersed at the same time. Individual slide stainers, on the other hand, apply reagent directly to each slide, and no two slides share the same aliquot of reagent. Examples of commercially available H&E stainers include the VENTANA SYMPHONY (individual slide stainer) and VENTANA HE 600 (individual slide stainer) series H&E stainers from Roche; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH.

IHC and/or ISH Slide Staining

In some embodiments, IHC and/or ISH slide staining can be performed manually. In other embodiments, IHC and/or ISH slide staining can be performed by a combination of manual and automatic methods. In some embodiments, IHC and/or ISH slide staining can be performed by staining systems including an automated slide staining platform. Automated slide stainers typically include at least: reservoirs of the various reagents used in the staining protocols, reagent dispense unit(s) adapted for dispensing reagent to onto a slide, a waste removal system for removing used reagents and other waste from the slide, and a control system that coordinates the actions of the reagent dispense unit(s) and waste removal system. In addition to performing staining steps, many automated slide stainers can also perform steps ancillary to staining (or are compatible with separate systems that perform such ancillary steps), including: slide baking (for adhering the sample to the slide), dewaxing (also referred to as deparaffinization), antigen retrieval, counterstaining, dehydration and clearing, and coverslipping. The Prichard reference describes several specific examples of automated IHC and/or ISH slide stainers and their various features, including the intelliPATH (Biocare Medical), WAVE (Celerus Diagnostics), DAKO OMNIS and DAKO AUTOSTAINER LINK 48 (Agilent Technologies), BENCHMARK (Ventana Medical Systems, Inc.), Leica BOND, and Lab Vision Autostainer (Thermo Scientific) automated slide stainers. Additionally, Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety.

Commercially-available staining units typically operate on one of the following principles: (1) open individual slide staining, in which slides are positioned horizontally and reagents are dispensed as a puddle on the surface of the slide containing a tissue sample (such as implemented on the DAKO AUTOSTAINER Link 48 (Agilent Technologies) and intelliPATH (Biocare Medical) stainers); (2) liquid overlay technology, in which reagents are either covered with or dispensed through an inert fluid layer deposited over the sample (such as implemented on VENTANA BenchMark and DISCOVERY stainers); (3) capillary gap staining, in which the slide surface is placed in proximity to another surface (which may be another slide or a coverplate) to create a narrow gap, through which capillary forces draw up and keep liquid reagents in contact with the samples (such as the staining principles used by DAKO TECHMATE, Leica BOND, and DAKO OMNIS stainers). Some iterations of capillary gap staining do not mix the fluids in the gap (such as on the DAKO TECHMATE and the Leica BOND). In variations of capillary gap staining termed dynamic gap staining, capillary forces are used to apply sample to the slide, and then the parallel surfaces are translated relative to one another to agitate the reagents during incubation to effect reagent mixing (such as the staining principles implemented on DAKO OMNIS slide stainers (Agilent)). In translating gap staining, a translatable head is positioned over the slide. A lower surface of the head is spaced apart from the slide by a first gap sufficiently small to allow a meniscus of liquid to form from liquid on the slide during translation of the slide. A mixing extension having a lateral dimension less than the width of a slide extends from the lower surface of the translatable head to define a second gap smaller than the first gap between the mixing extension and the slide. During translation of the head, the lateral dimension of the mixing extension is sufficient to generate lateral movement in the liquid on the slide in a direction generally extending from the second gap to the first gap. See WO 2011-139978 A1. It has recently been proposed to use inkjet technology to deposit reagents on slides. See WO 2016-170008 A1. This list of automated staining technologies is not intended to be comprehensive, and any fully or semi-automated system for performing biomarker staining may be used.

Image Analysis Systems

In an embodiment, following IHC and/or ISH staining, optical images of the sample may be generated by a microscope or by a computer-aided image analysis system, and may be analyzed by any method or methods known in the art to identify protein-positive versus protein negative cells, cells with HER2 gene amplification, and/or HER2 RNA-positive cells. Foci can be identified as regions having a minimum density of cells that satisfy the criteria for positivity. An image analysis system can include a light or fluorescence microscope, an image-transmitting camera, and a view screen. Preferably, the image analysis system also comprises a computer that can be used to direct the operation of the system and store and manipulate the information collected. An imaging system adapted for evaluating one or more digital images of a test sample stained according to the methods is described herein, and in some embodiments may be used. An exemplary imaging system is illustrated at FIG. 1.

The imaging system may include an image analysis system (100). Image analysis system (100) may include one or more computing devices such as desktop computers, laptop computers, tablets, smartphones, servers, application-specific computing devices, or any other type(s) of electronic device(s) capable of performing the techniques and operations described herein. In some embodiments, image analysis system (100) may be implemented as a single device. In other embodiments, image analysis system (100) may be implemented as a combination of two or more devices together achieving the various functionalities discussed herein. For example, image analysis system (100) may include one or more server computers and one or more client computers communicatively coupled to each other via one or more local-area networks and/or wide-area networks such as the Internet.

As illustrated in FIG. 1, image analysis system (100) may include a memory (116), a processor (117), and a display (118). Memory (116) may include any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. For brevity purposes memory (116) is depicted in FIG. 1 as a single device, but it is appreciated that memory (116) can also be distributed across two or more devices. Processor (117) may include one or more processors of any type, such as central processing units (CPUs), graphics processing units (GPUs), special-purpose signal or image processors, field-programmable gate arrays (FPGAs), tensor processing units (TPUs), and so forth. For brevity purposes processor (117) is depicted in FIG. 1 as a single device, but it is appreciated that processor (117) can also be distributed across any number of devices.

Display (118) may be implemented using any suitable technology, such as LCD, LED, OLED, TFT, Plasma, etc. In some implementations, display (118) may be a touch-sensitive display (a touchscreen).

As illustrated in FIG. 1, image analysis system (100) may also include an object identifier (110), a region of interest (ROI) generator (111), a user-interface module (112), and a scoring engine (114). While these modules are depicted in FIG. 1 as standalone modules, it will be evident to persons having ordinary skill in the art that each module may instead be implemented as a number of sub-modules, and that in some embodiments any two or more modules can be combined into a single module. Furthermore, in some embodiments, system (100) may include additional engines and modules (e.g., input devices, networking and communication modules, etc.) not depicted in FIG. 1 for brevity. Furthermore, in some embodiments, some of the blocks depicted in FIG. 1 may be disabled or omitted. As will be discussed in more detail below, the functionality of some or all modules of system (100) can be implemented in hardware, software, firmware, or as any combination thereof. Exemplary commercially-available software packages useful in implementing modules as disclosed herein include VENTANA VIRTUOSO; Definiens TISSUE STUDIO, DEVELOPER XD, and IMAGE MINER; and Visopharm BIOTOPIX, ONCOTOPIX, and STEREOTOPIX software packages.

After acquiring the image, image analysis system (100) may pass the image to an object identifier (110), which functions to identify and mark relevant objects and other features within the image that will later be used for scoring. Object identifier (110) may extract from (or generate for) each image a plurality of image features characterizing the various objects in the image as a well as pixels representing expression of the biomarker(s). The extracted image features may include, for example, texture features such as Haralick features, bag-of-words features and the like. The values of the plurality of image features may be combined into a high-dimensional vector, hereinafter referred to as the "feature vector" characterizing the expression of the biomarker. For example, if M features are extracted for each object and/or pixel, each object and/or pixel can be characterized by an M-dimensional feature vector. The output of object identifier (110) is effectively a map of the image annotating the position of objects and pixels of interest and associating those objects and pixels with a feature vector describing the object or pixels.

For biomarkers that are scored on the basis of the biomarker's association with a particular type of object (such as membranes, nuclei, cells, etc.), the features extracted by object identifier (110) may include features or feature vectors sufficient to categorize the objects in the sample as biomarker-positive objects of interest or biomarker-negative markers of interest and/or by level or intensity of biomarker staining of the object. In cases where the biomarker may be weighted differently depending on the object type that is expressing it, the features extracted by object identifier (110) may include features relevant to determining the type of objects associated with biomarker-positive pixels. Thus, the objects may then be categorized at least on the basis of biomarker expression (for example, biomarker-positive or biomarker-negative cells) and, if relevant, a sub-type of the object (e.g. tumor cell, immune cell, etc.). In cases where extent of biomarker-expression is scored regardless of association with objects, the features extracted by object identifier (110) may include for example location and/or intensity of biomarker-positive pixels. The precise features extracted from the image will depend on the type of classification function being applied, and would be well-known to a person of ordinary skill in the art.

The image analysis system (100) may also pass the image to ROI generator (111). ROI generator (111) is used to identify the ROI or ROIs of the image from which further information will be extracted. In cases where the object identifier (110) is not applied to the whole image, the ROI or ROIs generated by the ROI generator (111) may also be used to define a subset of the image on which object identifier (110) is executed. In cases where a portion of a sample will be dissected from the slide using a micor- or meso-dissection tool (not depicted), the ROI generator (111) may also be used to identify the regions for dissection.

In one embodiment, ROI generator (111) may be accessed through user-interface module (112). An image of the biomarker-stained sample (or a morphologically-stained serial section of the biomarker-stained sample) is displayed on a graphic user interface of the user interface module (112), and the user annotates one or more region(s) in the image to be considered ROIs. ROI annotation can take a number of forms in this example. For example, the user may manually define the ROI (referred to hereafter as "manual ROI annotation"). In other examples, the ROI generator (111) may assist the user in annotating the ROI (termed, "semi-automated ROI annotation"). For example, the user may delineate one or more regions on the digital image, which the system then automatically transforms into a complete ROI. For example, the system may identify similar morphological regions by, for example, using computer vision and machine learning. As another example, the user could annotate an edge in the image (such as, for example, a leading edge of an invasive margin of a tumor, an edge denoting a transition from tumor core to invasive margin, or an edge denoting a center of the invasive margin), and ROI generator (111) may automatically define an ROI based on the user-defined edge. For example, the user may annotate the edge of the invasive margin or the whole tumor in user interface module (112), and the ROI generator (111) creates an ROI using the edge as a guide, for example, by drawing an ROI encompassing all objects within a predefined distance of the edge, or within a predefined distance of one side of the edge, or within a first predefined distance on a first side of the edge and within a second predefined distance on a second side of the edge. Many other arrangements could be used as well. In cases in which ROI generation is semi-automated, the user may be given an option to modify the ROI annotated by ROI generator (111), such as by expanding the ROI, annotating regions of the ROI or objects within the ROI to be excluded from analysis, etc.

In other embodiments, ROI generator (111) may automatically suggest an ROI without any direct input from the user (for example, by applying a tissue segmentation function to an unannotated image), which the user may then chose to accept, reject, or edit as appropriate.

In some embodiments, ROI generator (111) may also include a registration function, whereby an ROI annotated in one section of a set of serial sections is automatically transferred to other sections of the set of serial sections. This functionality is especially useful when there are multiple biomarkers being analyzed, or when an H&E-stained serial section is provided along with the biomarker-labeled sections.

Figure 2A:
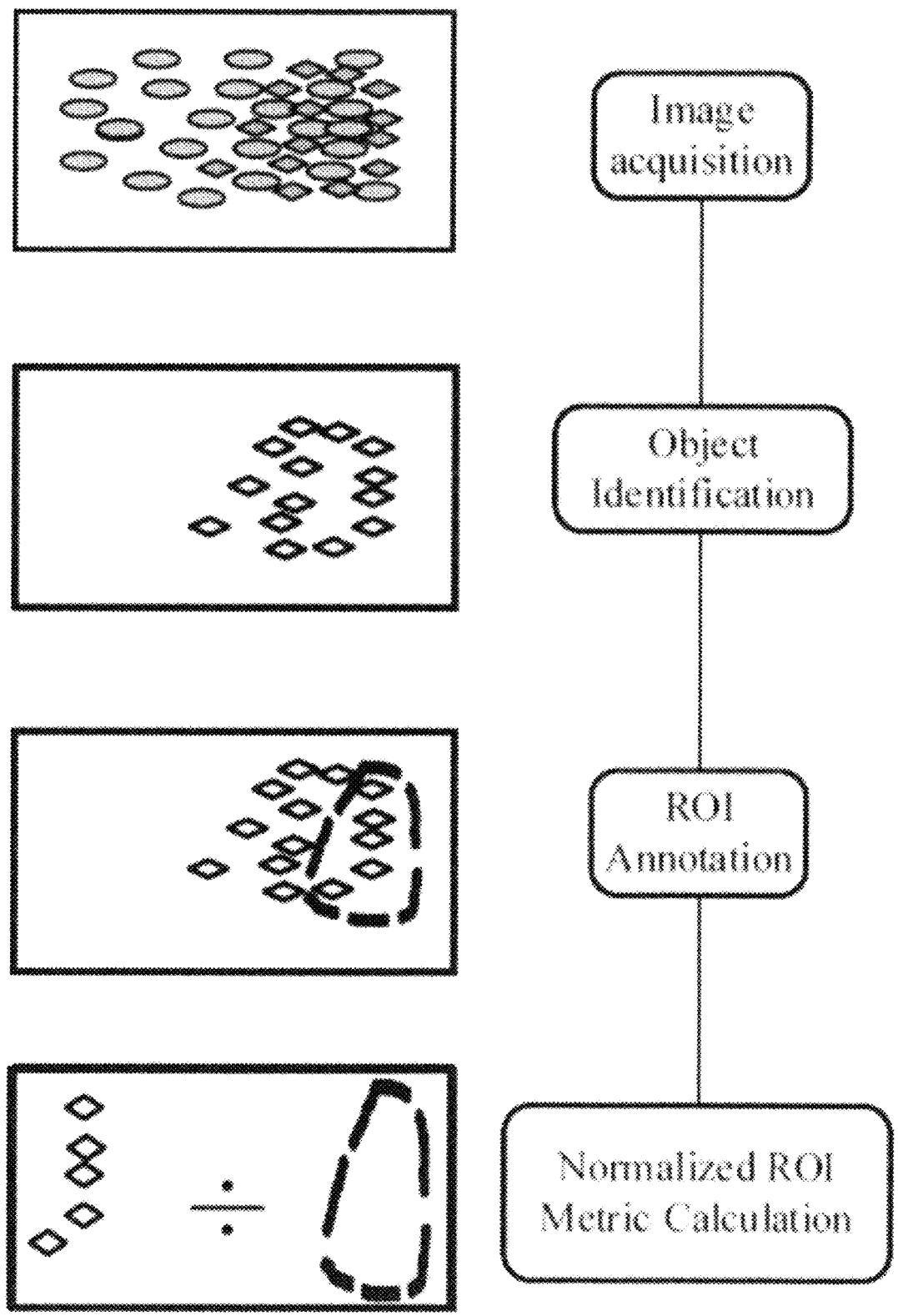
FIG. 2A shows a workflow in accordance with one embodiment of the present disclosure.
Figure 2B:
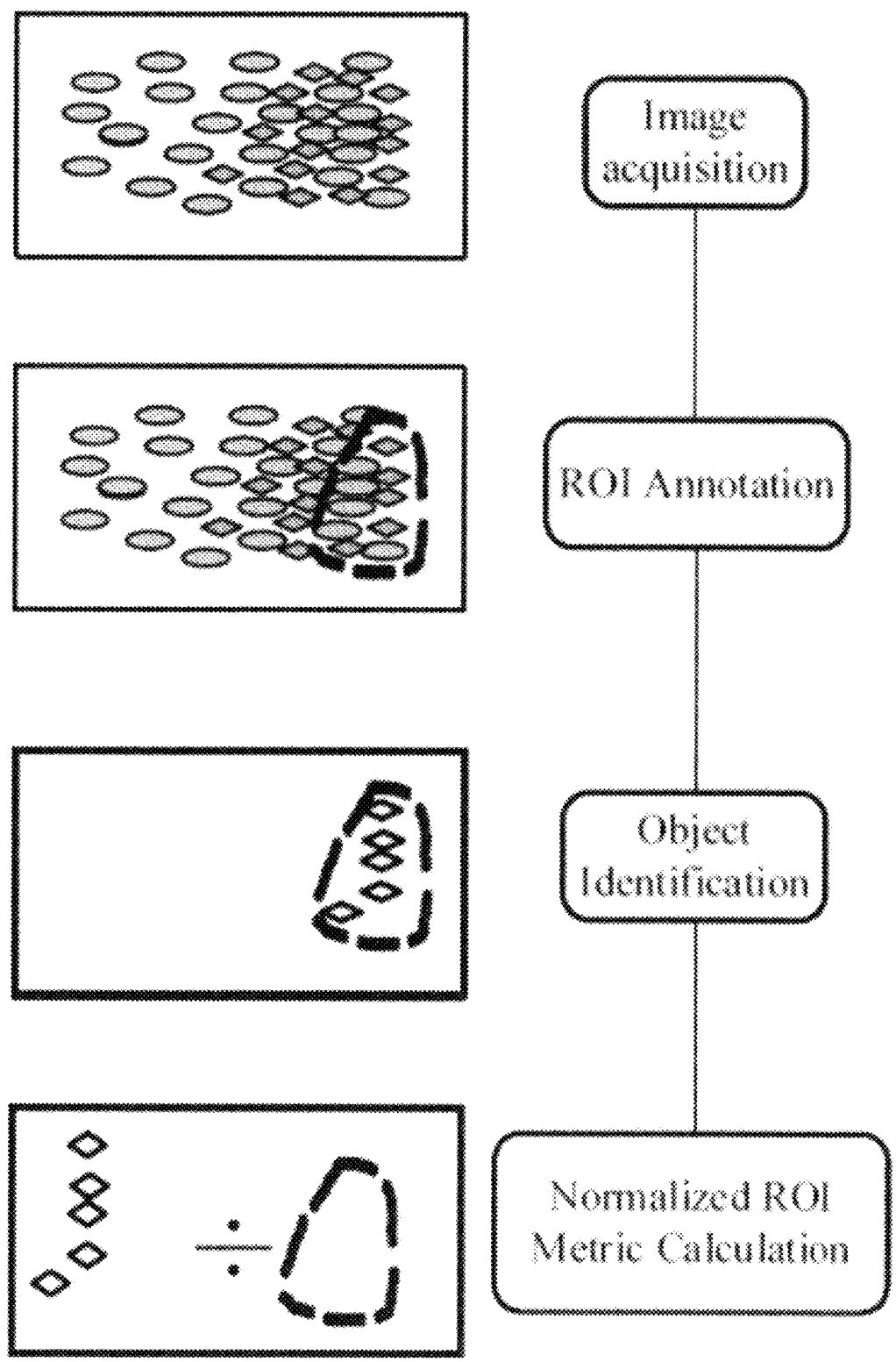
FIG. 2B shows a workflow in accordance with another embodiment of the present disclosure.

The object identifier (110) and the ROI generator (111) may be implemented in any order. For example, the object identifier (110) may be applied to the entire image first. The positions and features of the identified objects can then be stored and recalled later when the ROI generator (111) is implemented. In such an arrangement, a score can be generated by the scoring engine (113) immediately upon generation of the ROI. Such a workflow is illustrated at FIG. 2A. As can be seen at FIG. 2A, an image is obtained having a mixture of different object (illustrated by dark ovals, e.g., HER2 protein-positive tumor cells, and dark diamonds, e.g., HER2 protein-negative tumor cells). After object identification task is implemented, all diamonds in the image are identified (illustrated by open diamonds). When the ROI is appended to the image (illustrated by the dashed line, e.g., tumor invasive regions), only the diamonds located in the ROI region are included in the metric calculation for the ROI. A feature vector is then calculated including the feature metric and any additional metrics used by a continuous scoring function as described below. Alternatively, the ROI generator (111) can be implemented first. In this work flow, the object identifier (110) may be implemented only on the ROI (which minimizes computation time), or it may still be implemented on the whole image (which would allow on-the-fly adjustments without re-running the object identifier 110). Such a workflow is illustrated at FIG. 2B. As can be seen at FIG. 2B, an image is obtained having a mixture of different object (illustrated by dark ovals, e.g., HER2 protein-positive tumor cells, and dark diamonds, e.g., HER2-protein negative tumor cells). The ROI is appended to the image (illustrated by the dashed line, e.g., tumor invasive regions), but no objects have been marked yet. After object identification task is implemented on the ROI, all diamonds in the ROI are identified (illustrated by open diamonds, e.g., HER2-protein negative tumor cells) and included in the feature metric calculation for the ROI. A feature vector is then calculated including the feature metric(s) and any additional metrics used by the scoring function. It may also be possible to implement the object identifier (110) and ROI generator (111) simultaneously.

After both the object identifier (110) and ROI generator (111) have been implemented, a scoring engine (112) is implemented. The scoring engine (112) calculates feature metric(s) for the ROI from at least one ROI metric (such as ROI area or linear length of an ROI edge), relevant metrics for objects in the ROI (such as number of marker-positive objects), and, if being used, pre-determined maximum and/or minimum cutoffs and/or normalization factors. A ROI feature vector including the calculated feature metrics and any other variable derived from the ROI used by the scoring function are obtained and the scoring function is applied to the ROI feature vector.

As depicted in FIG. 1, in some embodiments image analysis system (100) may be communicatively coupled to an image acquisition system (120). Image acquisition system (120) may obtain images of samples and provide those images to image analysis system (100) for analysis and presentation to the user.

Figure 3:
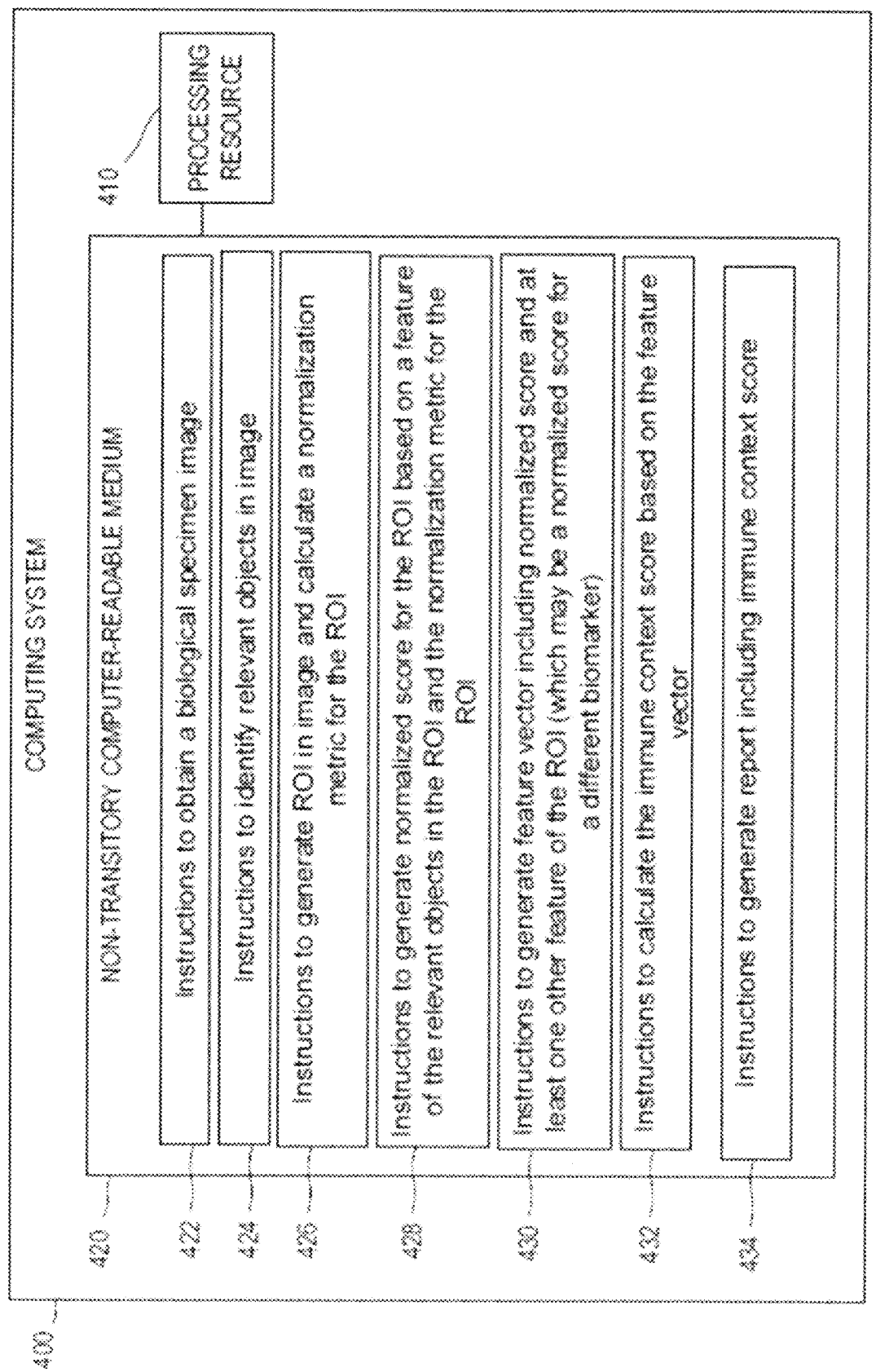
FIG. 3 shows a computing system in accordance with another embodiment of the present disclosure.

As illustrated in FIG. 3, the image analysis system may include a computing system (400) for implementing the various functions, the computing system (400) comprising a processing resource (410) and a non-transitory computer readable medium (420). The non-transitory computer readable medium (420) includes, for example, instructions to execute function(s) that: obtain a biological specimen image (422); identify relevant objects in the image (424); generate an ROI in the image (426); calculate an ROI metric for the ROI (426); generate a feature metric based on the relevant objects in the ROI, the ROI metric (428), and other optional factors being used, such as normalization factors and/or maximum and/or minimum feature values; generate a feature vector including the feature metric and at least one other feature metric of the sample (which may be, for example, an additional feature metric for a different biomarker) (430); calculate a score based on the feature vector (432); and generate a report including the score (434). For example, scoring may be categorized as Group A for samples exhibiting IHC 3+ and optionally, DISH+, optionally, RNA-ISH+, Group B for samples exhibiting IHC 3+ and optionally, DISH−, optionally, RNA-ISH−, Group C for samples exhibiting IHC 2+ and optionally, DISH+, optionally, RNA-ISH+, Group D for samples exhibiting IHC 2+ and optionally, DISH−, optionally, RNA-ISH−, Group E for samples exhibiting IHC 0, 1+ and optionally, DISH+, optionally, RNA-ISH+, and Group F for samples exhibiting IHC 0, 1+ and optionally, DISH−, optionally, RNA-ISH−.

Image acquisition system (120) may also include a scanning platform (125) such as a slide scanner that can scan the stained slides at 20×, 40×, or other magnifications to produce high resolution whole-slide digital images, including for example slide scanners as discussed above at section IV. At a basic level, the typical slide scanner includes at least: (1) a microscope with lens objectives, (2) a light source (such as halogen, light emitting diode, white light, and/or multispectral light sources, depending on the dye), (3) robotics to move glass slides around (or to move the optics around the slide), (4) one or more digital cameras for image capture, (5) a computer and associated software to control the robotics and to manipulate, manage, and view digital slides. Digital data at a number of different X-Y locations (and in some cases, at multiple Z planes) on the slide are captured by the camera's charge-coupled device (CCD), and the images are joined together to form a composite image of the entire scanned surface. Common methods to accomplish this include:

(1) Tile based scanning, in which the slide stage or the optics are moved in very small increments to capture square image frames, which overlap adjacent squares to a slight degree. The captured squares are then automatically matched to one another to build the composite image; and (2) Line-based scanning, in which the slide stage moves in a single axis during acquisition to capture a number of composite image "strips." The image strips can then be matched with one another to form the larger composite image.

A detailed overview of various scanners (both fluorescent and brightfield) can be found at Farahani et al., Whole slide imaging in pathology: advantages, limitations, and emerging perspectives, Pathology and Laboratory Medicine Int'l, Vol. 7, p. 23-33 (June 2015), the content of which is incorporated by reference in its entirety. Examples of commercially available slide scanners include: 3DHistech PANNORAMIC SCAN II; DigiPath PATHSCOPE; Hamamatsu NANOZOOMER RS, HT, and XR; Huron TISSUESCOPE 4000, 4000XT, and HS; Leica SCANSCOPE AT, AT2, CS, FL, and SCN400; Mikroscan D2; Olympus VS120-SL; Omnyx VL4, and VL120; PerkinElmer LAMINA; Philips ULTRA-FAST SCANNER; Sakura Finetek VISIONTEK; Unic PRECICE 500, and PRECICE 600x; VENTANA ISCAN COREO and ISCAN HT; and Zeiss AXIO SCAN.Z1. Other exemplary systems and features can be found in, for example, WO2011-049608) or in U.S. Patent Application No. 61/533,114, filed on Sep. 9, 2011, entitled IMAGING SYSTEMS, CASSETTES, AND METHODS OF USING THE SAME the content of which is incorporated by reference in its entirety.

Images generated by scanning platform (125) may be transferred to image analysis system (100) or to a server or database accessible by image analysis system (100). In some embodiments, the images may be transferred automatically via one or more local-area networks and/or wide-area networks. In some embodiments, image analysis system (100) may be integrated with or included in scanning platform (125) and/or other modules of image acquisition system (120), in which case the image may be transferred to image analysis system, e.g., through a memory accessible by both platform (125) and system (120). In some embodiments, image acquisition system (120) may not be communicatively coupled to image analysis system (100), in which case the images may be stored on a non-volatile storage medium of any type (e.g., a flash drive) and downloaded from the medium to image analysis system (100) or to a server or database communicatively coupled thereto. In any of the above examples, image analysis system (100) may obtain an image of a biological sample, where the sample may have been affixed to a slide and stained by histochemical staining platform (123), and where the slide may have been scanned by a slide scanner or another type of scanning platform (125). It is appreciated, however, that in other embodiments, below-described techniques may also be applied to images of biological samples acquired and/or stained through other means.

Automated Dissection Tools

In some embodiments, one or more of the biomarkers are evaluated in a sample excised from a tissue section. Automated dissection tools are devices that automatically excise tissue from slides. Typical automated dissection tools have two main components: (1) a tissue removal component that interacts with the tissue on the slide in a manner that precisely excises ROIs without substantially removing non-interested areas of the tissue; and (2) a computer-implemented guidance system that allows the user to select regions for excision in an image of the slide and guides the tissue removal component. Automated dissection tools generally fall into two categories: laser microdissection and mesodissection.

Laser microdissection tools typically comprise a microscope and a laser beam (with wavelengths in the infrared and/or ultraviolet range). A review of various laser microdissection technologies can be found at Legres et al. The user selects cells for excision from the guidance system, the laser cuts the area surrounding the region-of-interest (ROI), and the cells of the ROI are removed. In an embodiment, the automated dissection tool is a laser microdissection tool.

Mesodissection tools essentially are tissue mills. In the typical design, a slide is placed on a stage that controls X and Y axis. The tissue is forced against a rotating cutting bit to cut the desired sections from the slide, and the cut sections are removed from the slide. An example of a mesodissection tool is described by Adey et al. In the example described by Adey, a cutting bit is used that simultaneously dispenses a liquid on the slide and aspirates the liquid from the slide. As the tissue is cut, it is suspended in the liquid and aspirated along with the aspirated liquid. A software system is provided that allows the user to digitally annotate the tissue sections for excision. In an embodiment, the automated dissection tool is a mesodissection tool.

EXAMPLES

Although gastric cancer HER2 heterogeneity is known, the definition of gastric cancer HER2 heterogeneity, however, has not been well-defined yet in the scientific and medical literature. HER2-positive gastric cancer (GC) demonstrates more HER2 intratumoral heterogeneity (ITH) compared to breast cancer (BC) and patients with GC may not respond to HER2-targeted therapy like BC patients. Therefore, the present inventors investigated HER2 ITH at HER2 gene, mRNA, and protein levels in HER2-positive GC.

Example 1 mRNA-ISH and Protein IHC on Separate Serial Surgical Tissue Resections
Methods
GC Samples To understand a big picture of HER2 heterogeneity in gastric cancer, instead of using biopsy samples, which are much smaller than needle core biopsy samples, formalin-fixed, paraffin-embedded surgical resection of GC tissue samples were used to assess HER2 status. Surgical resection GC samples (not biopsy samples) of HER2-positive and -negative cases from 18 gastric cancer patients were analyzed with serial sections using: 1) HER2 gene-protein assay (GPA) for concurrent detection of HER2 gene, chromosome 17 centromere, and HER2 protein at the individual cell level and 2) HER2 RNA in situ hybridization (ISH). Multiple tissue blocks were included from the majority of patients and total of 37 tissue blocks were included in this study.

HER2 Gene-Protein Assay (GPA)

GPA protocol was performed as described in Nitta et al. (Diagnostic Pathology 2012, 7:60), which is incorporated by reference. Briefly, the HER2 gene-protein assay was developed on the BenchMark XT using FFPE xenograft tumors and clinical breast cancer samples. The samples were stained under a variety of assay conditions to determine an optimum protocol needed to achieve HER2 protein, HER2 gene, and CEN17 staining results comparable to those of the individual HER2 IHC and HER2 & CEN17 BISH assays.

Optimum signal detection in the HER2 gene-protein assay was achieved by performing the IHC procedure before the BISH procedure. Reagent lots were consistent for all TMA slides across all assays and all assays were completed within one week.

The GC TMA slides were subjected to the final optimized HER2 gene-protein staining protocol after the paraffin-embedded tissue cores were deparaffinized with a Liquid Coverslip (Ventana)-primed EZ Prep method. For HER2 protein staining, the TMA slides were heat pre-treated with CC1 standard cell conditioning at 100° C. and endogenous peroxidase was inactivated by incubation with hydrogen peroxide for 4 min at 37° C. The tissue cores were incubated with the rabbit monoclonal anti-HER2 antibody for 32 min at 37° C. and the endogenous biotin was blocked using Endogenous Biotin Blocking Kit. The slides were incubated with a biotinylated secondary antibody for 8 min and then with a HRP-conjugated streptavidin for 8 min at 37° C. A copper enhanced DAB reaction was used to visualize the HER2 protein.

For HER2 gene & CEN17 staining, the TMA slides were subjected to three 12 min cycles of heat pre-treatment in EZ Prep-diluted CC2 at 90° C. and then to mild tissue digestion with ISH Protease 3 for 16 min at 37° C. The tissue samples were then hybridized with a cocktail of DNP-labelled HER2 and DIG-labelled CEN17 probes at 44° C. for 6 h after denaturing for 4 min at 80° C. Hyb-Clear blocking solution (Ventana), a hybridization buffer containing naphthol phosphate, was added to the probe cocktail to block the interaction between the DNP hapten on the HER2 probe and the DAB deposit during hybridization. Three 8 min stringency washes were carried out in 2×SSC at 72° C.

For HER2 gene detection, the tissue samples were incubated with a rabbit anti-DNP antibody for 20 min at 37° C. followed by incubation with a HRP-conjugated goat anti-rabbit antibody for 24 min at 37° C. HER2 BISH signal was developed for 8 min by the metallic silver deposit with silver acetate, hydroquinone, and hydrogen peroxide. For CEN17 detection, the slides were incubated with a mouse anti-DIG antibody for 20 min at 37° C. followed by an AP-conjugated goat anti-mouse antibody incubation for 32 min at 37° C. CEN17 BISH signal was developed with a fast red and naphthol phosphate mixture for 12 min at 37° C. HER2 gene-protein slides were counterstained with Hematoxylin II for 8 min followed by Bluing Reagent for 4 min at 37° C. Air-dried slides were coverslipped with the film coverslipper.

GPA Workflows for Identification of HER2 Genetic and Non-Genetic ITH

Figure 4:
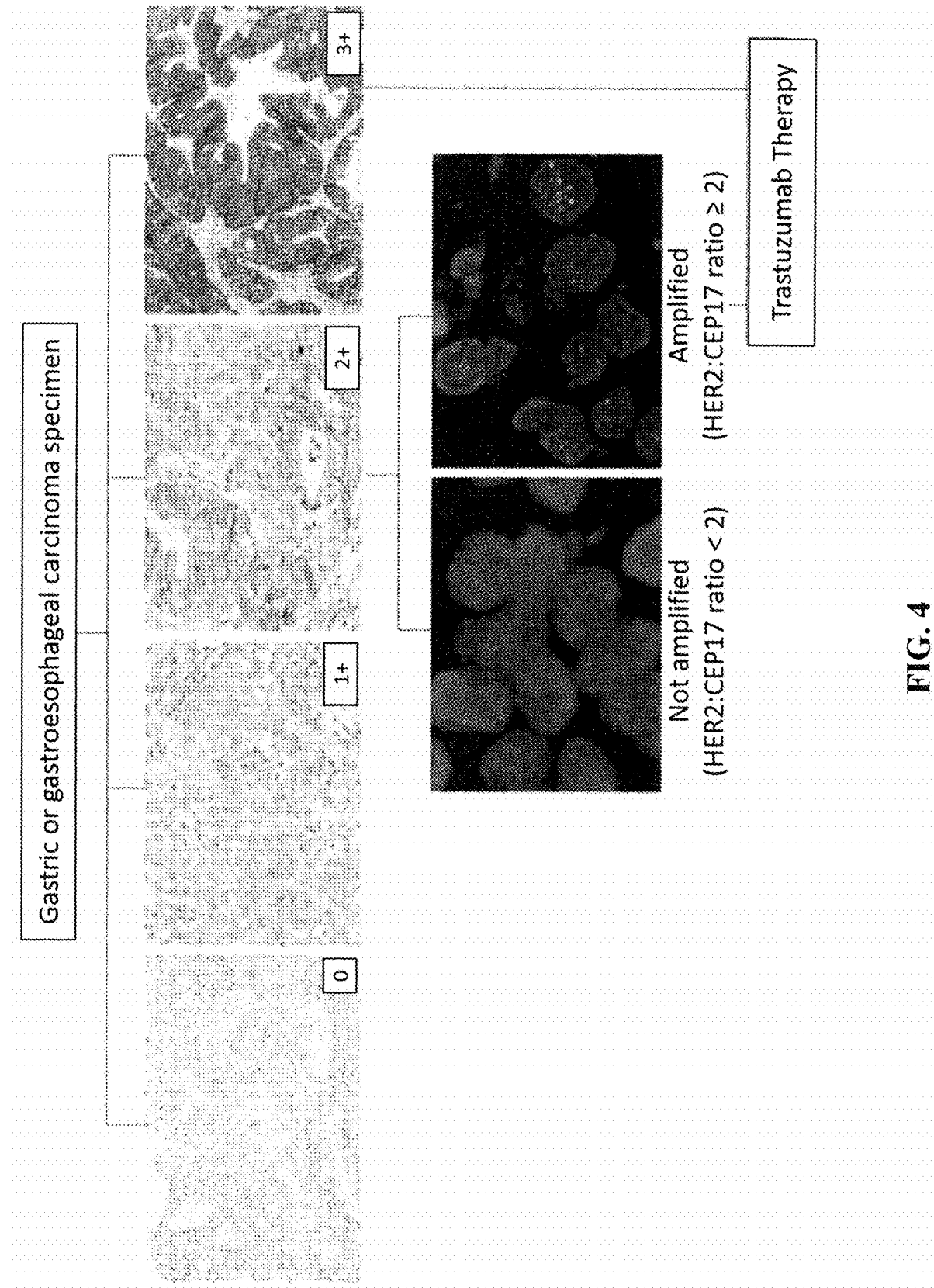
FIG. 4 shows a diagnostic algorithm for HER2 status evaluation in gastric cancer in accordance with one embodiment of the present disclosure.

FIG. 4 shows an example of diagnostic algorithm for HER2 status evaluation in GC. Immunohistochemistry (IHC) represents the initial testing method. IHC score 0 and 1+ are considered negative while score 3+ cases are considered positive and do not need further testing. Fluorescence in situ hybridization testing is required only for equivocal IHC score 2+ cases. On the basis of HER2 (red spots): CEP 17 (green spots) ratio (<2 vs ≤2) patients are eligible or not to anti-HER2 therapy.

Figure 5:
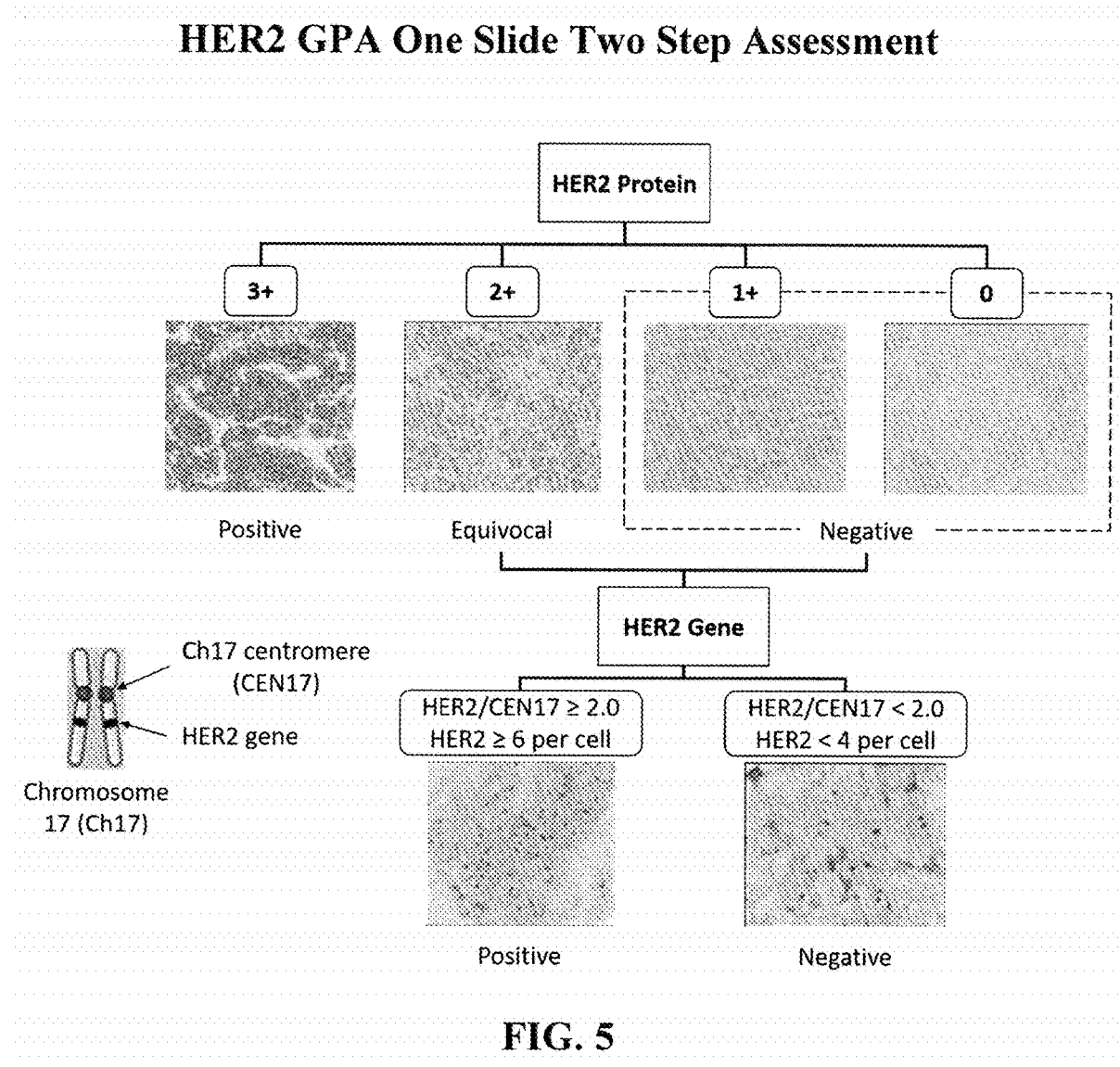
FIG. 5 shows two step HER2 status assessment gastric cancer cases using a single slide HER2 gene-protein assay (GPA) in accordance with one embodiment of the present disclosure.

FIG. 5 shows two step HER2 status assessment GC cases using a single slide HER2 gene-protein assay (GPA). HER2 GPA technology allows detection of HER2 gene and protein simultaneously and the HER2 status assessment can be achieved at the individual cell level. At the first step, HER2 protein status is graded with HER2 immunohistochemical staining. In the second step, HER2 protein equivocal and negative cases are further analyzed for their HER2 gene status with HER2 dual in situ hybridization staining for HER2 gene and chromosome 17 (CEN17). HER2 protein and/or gene positive patients are eligible for HER2-targeted therapy.

HER2 RNA In Situ Hybridization (ISH)

Formalin-fixed, paraffin-embedded surgical resection of GC tissue sample slides were dewaxed and pre-treated using the RNAScope Sample Prep kit (Advanced Cell Diagnostics) according to the manufacturers recommendations. The dewax solution was applied to the slide twice and incubated on the slide for 8 minutes each time at 60° C. Target retrieval solution was applied to the slide and incubated for 30 minutes at 97° C. A protease solution may be also applied to the slide for 20 minutes at 37° C. RNAScope HER2 target probe and VS Universal HRP Amp kits (Advanced Cell Diagnostics) were applied to the slide according to the manufacturer's instructions. The mRNA was detected using the DISCOVERY mRNA Purple HRP kit (Roche). All steps were performed and fully automated on the DISCOVERY ULTRA instrument.

The following is a step-by-step detailing the application of the reagents on the instruments.

Procedure: mRNA Universal RNAscope Final-AM (v0.00.0190)

Discovery ULTRA Staining Module

| Step No. | Procedure Step |
| --- | --- |
| 1 | [mRNA Universal Procedure v1] |
| 2 | Enable Mixers |
| 3 | Warmup Slide to 37° C. |
| 4 | [Delay refers to a time delayed start: Select time until run start] |
| 5 | Disable Mixers |
| 6 | Warmup Slide to 58° C., and Incubate for 4 Minutes |
| 7 | Apply CC Coverslip Long |
| 8 | Incubate for 8 Minutes |
| 9 | Apply CC Coverslip Long |
| 10 | Incubate for 8 Minutes |
| 11 | Apply CC Coverslip Long |
| 12 | Incubate for 8 Minutes |
| 13 | Apply EZPrep Volume Adjust |
| 14 | Enable Mixers |
| 15 | Warmup Slide to 60° C., and Incubate for 4 Minutes |
| 16 | Rinse Slide With EZ Prep |
| 17 | Incubate for 4 Minutes |
| 18 | Apply EZPrep Volume Adjust |

-continued

| Step No. | Procedure Step |
|---|---|
| 19 | [Dewax] |
| 20 | Apply One Drop of DETECTION 6, and Incubate for 4 Minutes |
| 21 | Warmup Slide to 60° C., and Incubate for 4 Minutes |
| 22 | Rinse Slide With EZ Prep |
| 23 | Incubate for 4 Minutes |
| 24 | Apply EZPrep Volume Adjust |
| 25 | Apply One Drop of DETECTION 6, and Incubate for 4 Minutes |
| 26 | Warmup Slide to 60° C., and Incubate for 4 Minutes |
| 27 | Rinse Slide With EZ Prep |
| 28 | Incubate for 4 Minutes |
| 29 | Apply EZPrep Volume Adjust |
| 30 | Warmup Slide to 60° C., and Incubate for 4 Minutes |
| 31 | Rinse Slide With EZ Prep |
| 32 | Incubate for 4 Minutes |
| 33 | Apply EZPrep Volume Adjust |
| 34 | Warmup Slide to 69° C., and Incubate for 4 Minutes |
| 35 | Rinse Slide With EZ Prep |
| 36 | Apply Depar Volume Adjust |
| 37 | Apply Coverslip |
| 38 | Disable Slide Heater |
| 39 | Warmup Slide to 37° C. |
| 40 | Rinse Slide With EZ Prep |
| 41 | Adjust Slide Volume With EZ Prep |
| 42 | Apply Coverslip |
| 43 | [RECOMMENDED: Set to 97° C. and 16 min for FFPE cell pellets or 24 min for normal FFPE tissue] |
| 44 | Rinse Slide With EZ Prep |
| 45 | Apply 300 ul of EZ Prep |
| 46 | [Target Retrieval] |
| 47 | Apply Three Drops of ACD Pretreat 2 and Incubate for 4 Minutes |
| 48 | Incubate for 4 Minutes |
| 49 | Apply CC Medium Coverslip |
| 50 | Warmup Slide to [97° C.] from All Temperatures (Cycle 1) |
| 51 | Incubate for 8 Minutes |
| 52 | Apply 300 ul of EZ Prep |
| 53 | Incubate for 8 Minutes |
| 54 | Apply 300 ul of EZ Prep |
| 55 | Incubate for 8 Minutes |
| 56 | Disable Slide Heater |
| 57 | Apply Cell Conditioner #1 |
| 58 | Apply CC Medium Coverslip No BB |
| 59 | Rinse Slide With Reaction Buffer |
| 60 | Adjust Slide Volume With Reaction Buffer |
| 61 | Apply Coverslip |
| 62 | Incubate for 4 Minutes |
| 63 | Rinse Slide With Reaction Buffer |
| 64 | Adjust Slide Volume With Reaction Buffer |
| 65 | Apply Coverslip |
| 66 | [RECOMMENDED: Set to 37° C. and 16 min for normal FFPE samples] |
| 67 | Rinse Slide With Reaction Buffer |
| 68 | Adjust Slide Volume With Reaction Buffer |
| 69 | [Protease] |
| 70 | Apply Two Drops of ACD Pretreat 3, Apply Coverslip, and Incubate for 0 Hr 4 Min |
| 71 | Warmup Slide to [37° C.], and Incubate for [0 Hr 16 Min] (Pre-treatment #3 Temp RB) |
| 72 | Disable Slide Heater |
| 73 | Rinse Slide With Reaction Buffer |
| 74 | Adjust Slide Volume With Reaction Buffer |
| 75 | Apply Coverslip |
| 76 | [Only select one mRNA option as multiple selections will yield negative results] |
| 77 | [Select an Inhibitor NOTE: DISCOVERY Inhibitor to be used with fluorescence] |
| 78 | [DISCOVERY Inhibitor will be applied for singleplex fluorescence] |
| 79 | Rinse Slide With Reaction Buffer |
| 80 | Adjust Slide Volume With Reaction Buffer |

-continued

| Step No. | Procedure Step |
|---|---|
| 81 | Apply Coverslip |
| 82 | Rinse Slide With Reaction Buffer |
| 83 | Adjust Slide Volume With Reaction Buffer |
| 84 | Apply Two Drops of DISC Inhibitor, Apply Coverslip, and Incubate for 4 Minutes |
| 85 | Warmup Slide to 37° C., and Incubate for 12 Minutes |
| 86 | Disable Slide Heater |
| 87 | Rinse Slide With Reaction Buffer |
| 88 | Adjust Slide Volume With Reaction Buffer |
| 89 | Apply Coverslip |
| 90 | Rinse Slide With SSC |
| 91 | Adjust Slide Volume With SSC |
| 92 | Apply Two Drops of [PROBE 7] (Probe #1), Apply Coverslip, and Incubate for 4 Minutes |
| 93 | Warmup Slide to [43° C.], and Incubate for 2 Hours (Hybridization) |
| 94 | Disable Slide Heater |
| 95 | Incubate for 4 Minutes |
| 96 | Rinse Slide With SSC |
| 97 | Apply CC Coverslip |
| 98 | Rinse Slide With SSC |
| 99 | Rinse Slide With SSC |
| 100 | Incubate for 4 Minutes |
| 101 | Rinse Slide With SSC |
| 102 | Adjust Slide Volume With SSC |
| 103 | [Amp 1 HRP] |
| 104 | [RECOMMENDED: Temperature = 39° C. for most samples] |
| 105 | Apply Two Drops of ACD AMP 1, Apply Coverslip, and Incubate for 4 Minutes |
| 106 | Incubate for 8 Minutes |
| 107 | Warmup Slide to [39° C.], and Incubate for 32 Minutes (Hybridization #5) |
| 108 | Disable Slide Heater |
| 109 | Rinse Slide With Reaction Buffer |
| 110 | Incubate for 4 Minutes |
| 111 | Rinse Slide With Reaction Buffer |
| 112 | Rinse Slide With Reaction Buffer |
| 113 | Apply Medium Cell Conditioner #1 |
| 114 | Incubate for 4 Minutes |
| 115 | Apply Medium Cell Conditioner #1 |
| 116 | Incubate for 8 Minutes |
| 117 | Rinse Slide With SSC |
| 118 | Adjust Slide Volume With SSC |
| 119 | [Amp 2 HRP] |
| 120 | [RECOMMENDED: Temperature = 39° C. for most samples] |
| 121 | Apply Two Drops of ACD AMP 2, Apply Coverslip, and Incubate for 4 Minutes |
| 122 | Incubate for 8 Minutes |
| 123 | Warmup Slide to [39° C.], and Incubate for 32 Minutes (Hybridization #6) |
| 124 | Disable Slide Heater |
| 125 | Rinse Slide With Reaction Buffer |
| 126 | Incubate for 4 Minutes |
| 127 | Rinse Slide With Reaction Buffer |
| 128 | Rinse Slide With Reaction Buffer |
| 129 | Apply Medium Cell Conditioner #1 |
| 130 | Incubate for 4 Minutes |
| 131 | Apply Medium Cell Conditioner #1 |
| 132 | Incubate for 4 Minutes |
| 133 | Apply Medium Cell Conditioner #1 |
| 134 | Incubate for 8 Minutes |
| 135 | Rinse Slide With SSC |
| 136 | Rinse Slide With SSC |
| 137 | Adjust Slide Volume With SSC |
| 138 | [Amp 3 HRP] |
| 139 | Apply Two Drops of ACD AMP 3, Apply Coverslip, and Incubate for 4 Minutes |
| 140 | Warmup Slide to 37° C., and Incubate for 0 Hr 12 Min |
| 141 | Disable Slide Heater |
| 142 | Rinse Slide With SSC |
| 143 | Rinse Slide With SSC |
| 144 | Adjust Slide Volume With SSC |

-continued

| Step No. | Procedure Step |
|---|---|
| 145 | [Amp 4 HRP] |
| 146 | Apply Two Drops of ACD AMP 4, Apply Coverslip, and Incubate for 4 Minutes |
| 147 | Warmup Slide to 37° C., and Incubate for 32 Minutes |
| 148 | Disable Slide Heater |
| 149 | Rinse Slide With SSC |
| 150 | Rinse Slide With SSC |
| 151 | Incubate for 4 Minutes |
| 152 | Rinse Slide With SSC |
| 153 | Adjust Slide Volume With SSC |
| 154 | Incubate for 4 Minutes |
| 155 | Rinse Slide With Reaction Buffer |
| 156 | Rinse Slide With Reaction Buffer |
| 157 | Adjust Slide Volume With Reaction Buffer |
| 158 | [Amp 5 HRP] |
| 159 | Apply Two Drops of ACD AMP 5, and Incubate for 12 Minutes |
| 160 | Apply Coverslip |
| 161 | [Amp 5 HRP incubation time] |
| 162 | [Amp 5 HRP incubation time; RECOMMENDED: 4 min] |
| 163 | Incubate for [0 Hr 4 Min] (Hybridization #6) |
| 164 | Rinse Slide With Reaction Buffer |
| 165 | Rinse Slide With Reaction Buffer |
| 166 | Apply Coverslip |
| 167 | Incubate for 4 Minutes |
| 168 | Rinse Slide With Reaction Buffer |
| 169 | Adjust Slide Volume With Reaction Buffer |
| 170 | [Amp 6 HRP] |
| 171 | Apply Two Drops of ACD AMP 6, and Incubate for 12 Minutes |
| 172 | Apply Coverslip |
| 173 | Incubate for 24 Minutes |
| 174 | Rinse Slide With Reaction Buffer |
| 175 | Rinse Slide With Reaction Buffer |
| 176 | Apply Coverslip |
| 177 | Incubate for 4 Minutes |
| 178 | Rinse Slide With Reaction Buffer |
| 179 | Adjust Slide Volume With Reaction Buffer |
| 180 | [Amp 7 HRP] |
| 181 | Apply Two Drops of ACD AMP 7, Apply Coverslip, and Incubate for 4 Minutes |
| 182 | Rinse Slide With Reaction Buffer |
| 183 | Adjust Slide Volume With Reaction Buffer |
| 184 | [Default detection is mRNA DAB] |
| 185 | Rinse Slide With Reaction Buffer |
| 186 | Adjust Slide Volume With Reaction Buffer |
| 187 | Apply Coverslip |
| 188 | Apply Two Drops of DISC Purple, and Incubate for 4 Minutes |
| 189 | Apply One Drop of DISC $H_2O_2$ P, and Incubate for [1 Hour] |
| 190 | Rinse Slide With Reaction Buffer |
| 191 | Adjust Slide Volume With Reaction Buffer |
| 192 | Apply Coverslip |
| 193 | Rinse Slide With Reaction Buffer |
| 194 | Adjust Slide Volume With Reaction Buffer |
| 195 | Apply One Drop of [HEMATOXYLIN II] (Counterstain), Apply Coverslip, and Incubate for [4 Minutes] |
| 196 | Rinse Slide With Reaction Buffer |
| 197 | Adjust Slide Volume With Reaction Buffer |
| 198 | Rinse Slide With Reaction Buffer |
| 199 | Adjust Slide Volume With Reaction Buffer |
| 200 | Apply One Drop of [BLUING REAGENT] (Post Counterstain), Apply Coverslip, and Incubate for [4 Minutes] |
| 201 | Rinse Slide With Reaction Buffer |
| 202 | Adjust Slide Volume With Reaction Buffer |
| 203 | Apply Coverslip |

* one drop is one reagent dispense

Results

Figure 6:
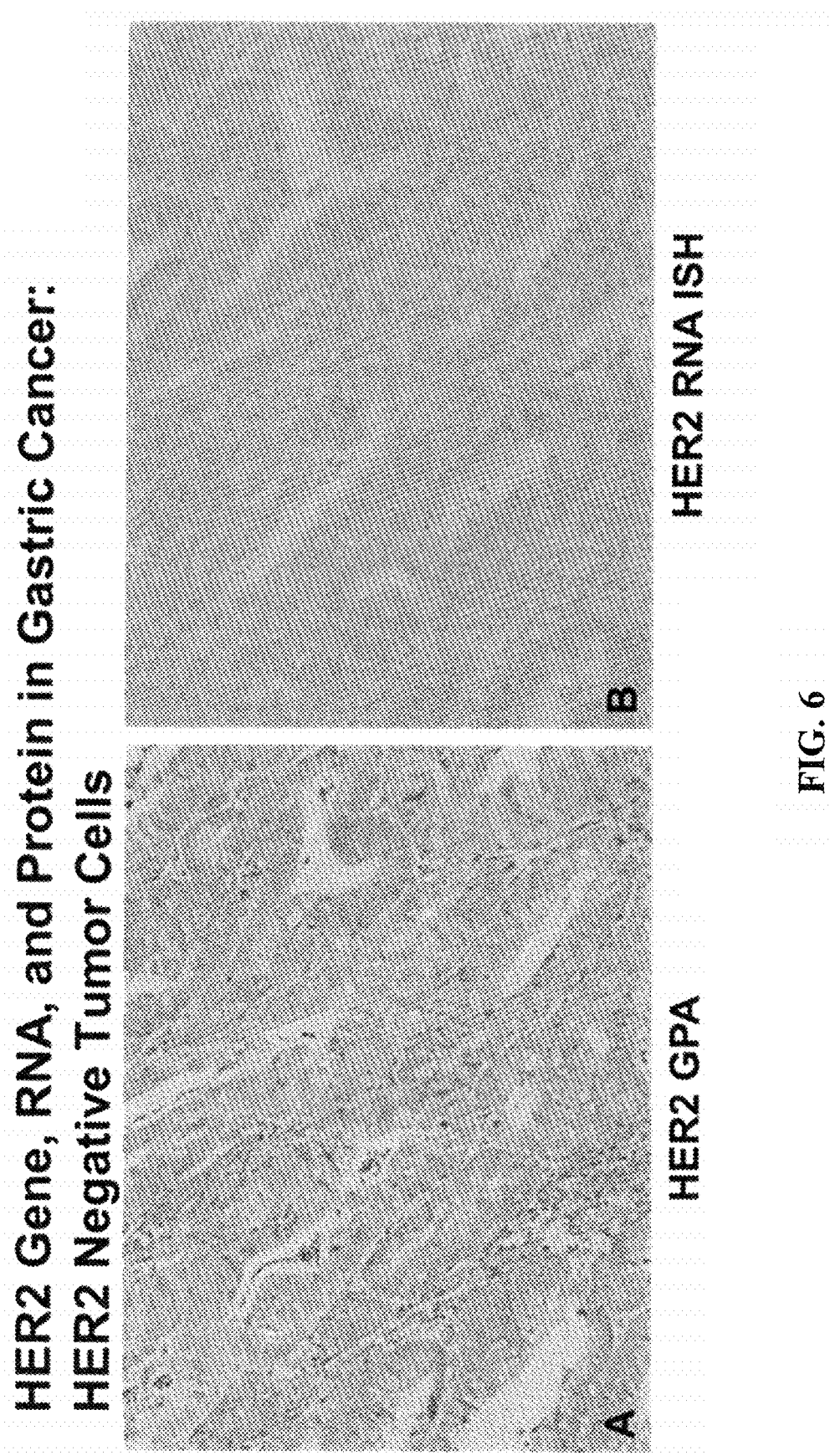
FIG. 6 shows HER2-negative (HER2 gene, HER2 RNA, and HER2 protein) gastric cancer in accordance with one embodiment of the present disclosure.
Figure 7:
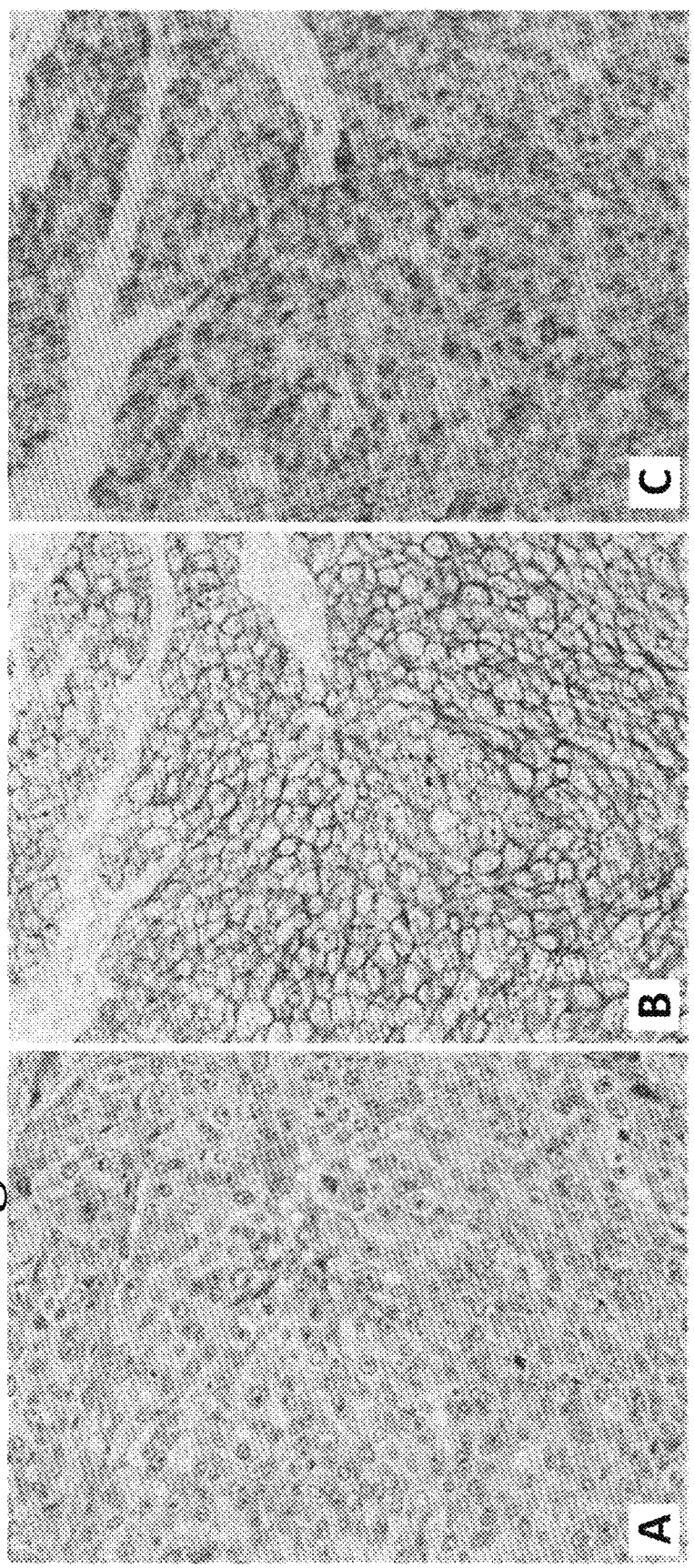
FIG. 7 shows homogenous HER2-positive (HER2 gene, HER2 RNA, and HER2 protein) gastric cancer in accordance with one embodiment of the present disclosure.
Figure 8:
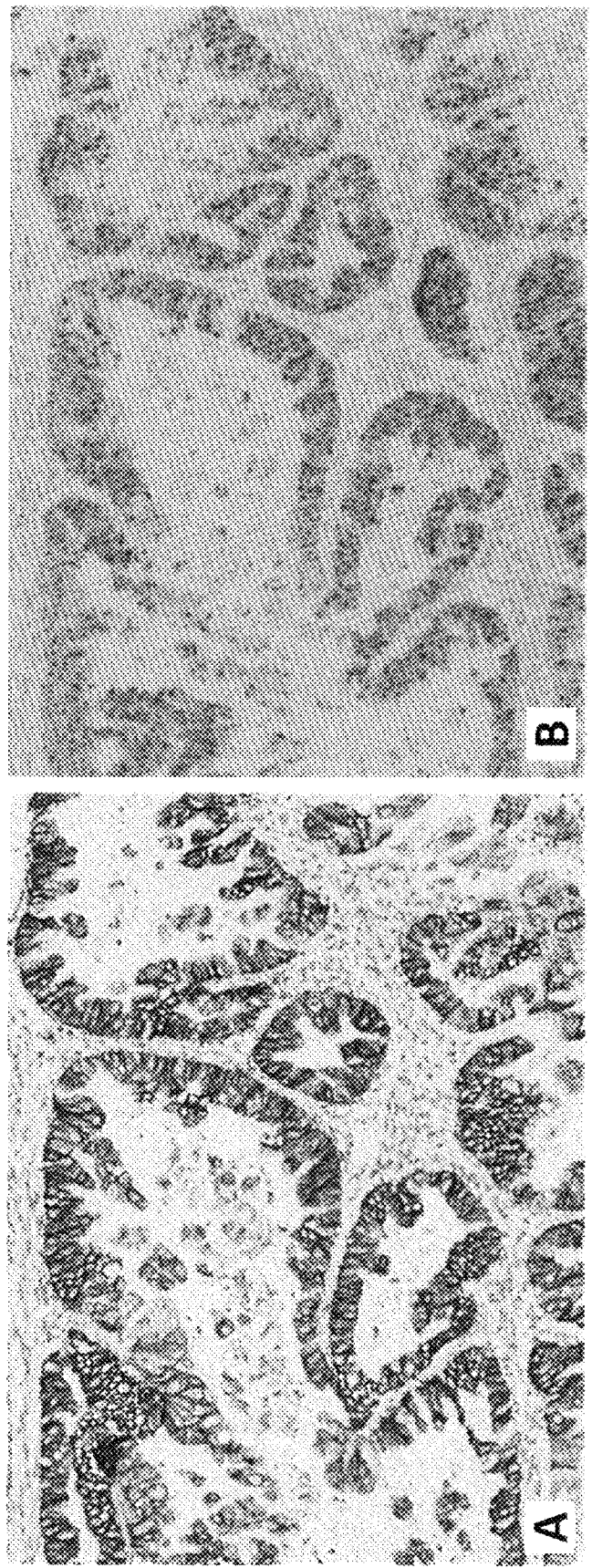
FIG. 8 shows homogenous HER2-positive (HER2 gene, HER2 RNA, and HER2 protein) gastric cancer in accordance with another embodiment of the present disclosure.
Figure 9:
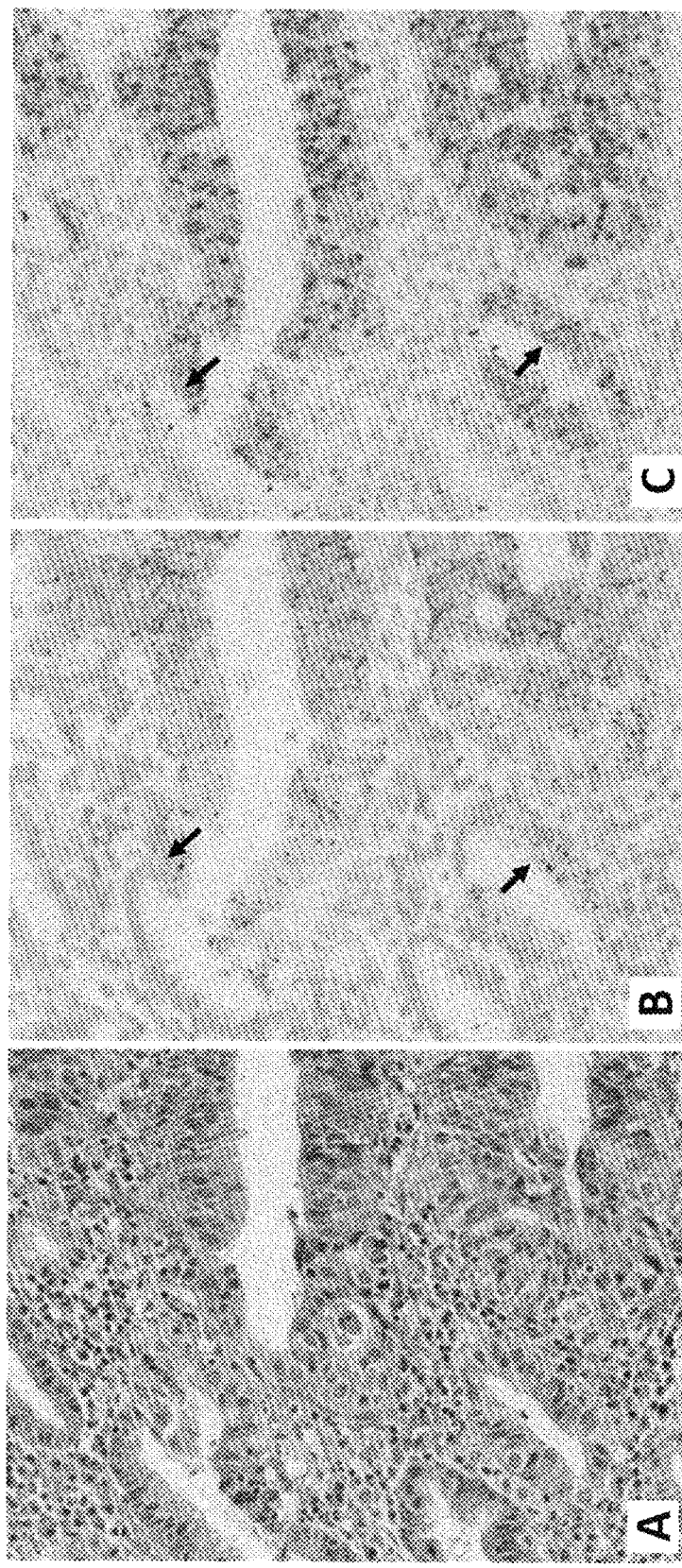
FIG. 9 shows HER2 non-genetic heterogeneity in gastric cancer in accordance with one embodiment of the present disclosure.
Figure 10:
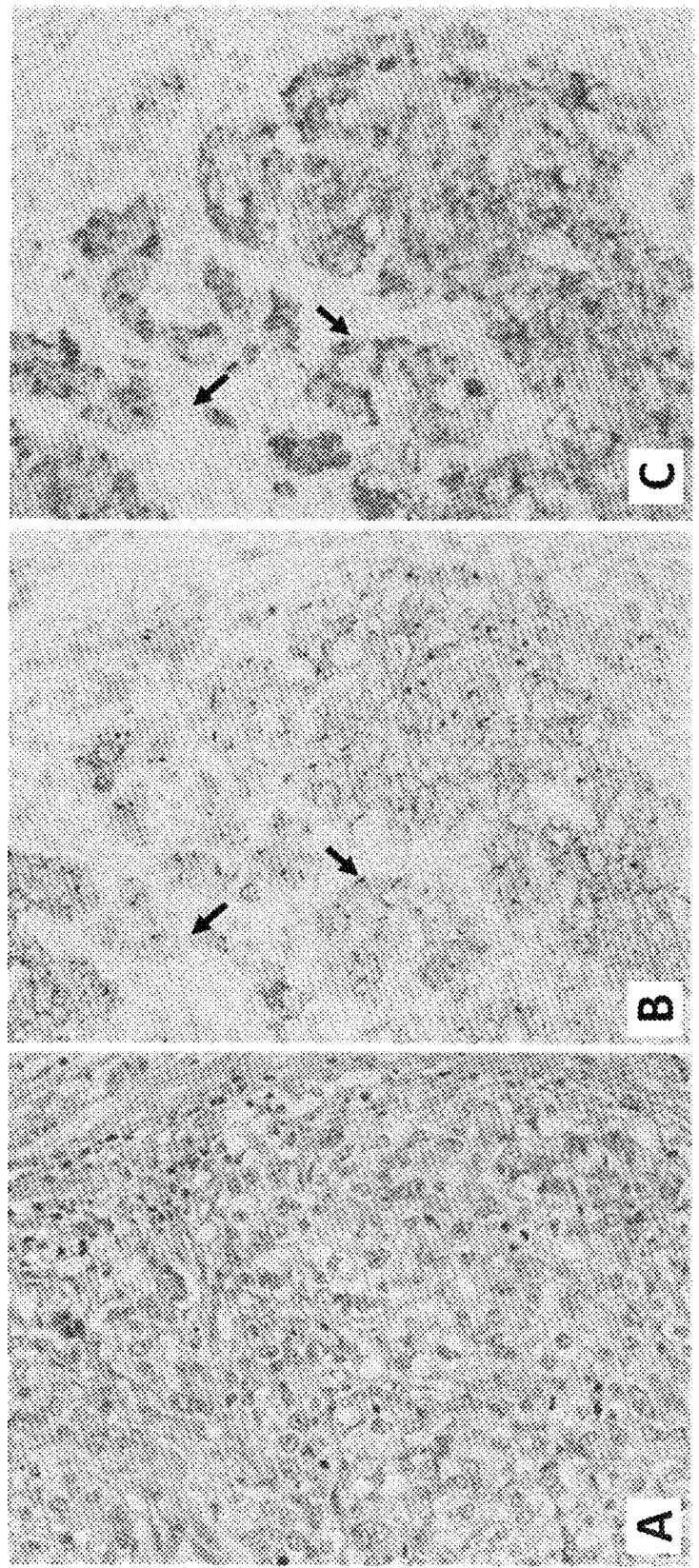
FIG. 10 shows HER2 non-genetic heterogeneity in gastric cancer in accordance with another embodiment of the present disclosure.
Figure 11:
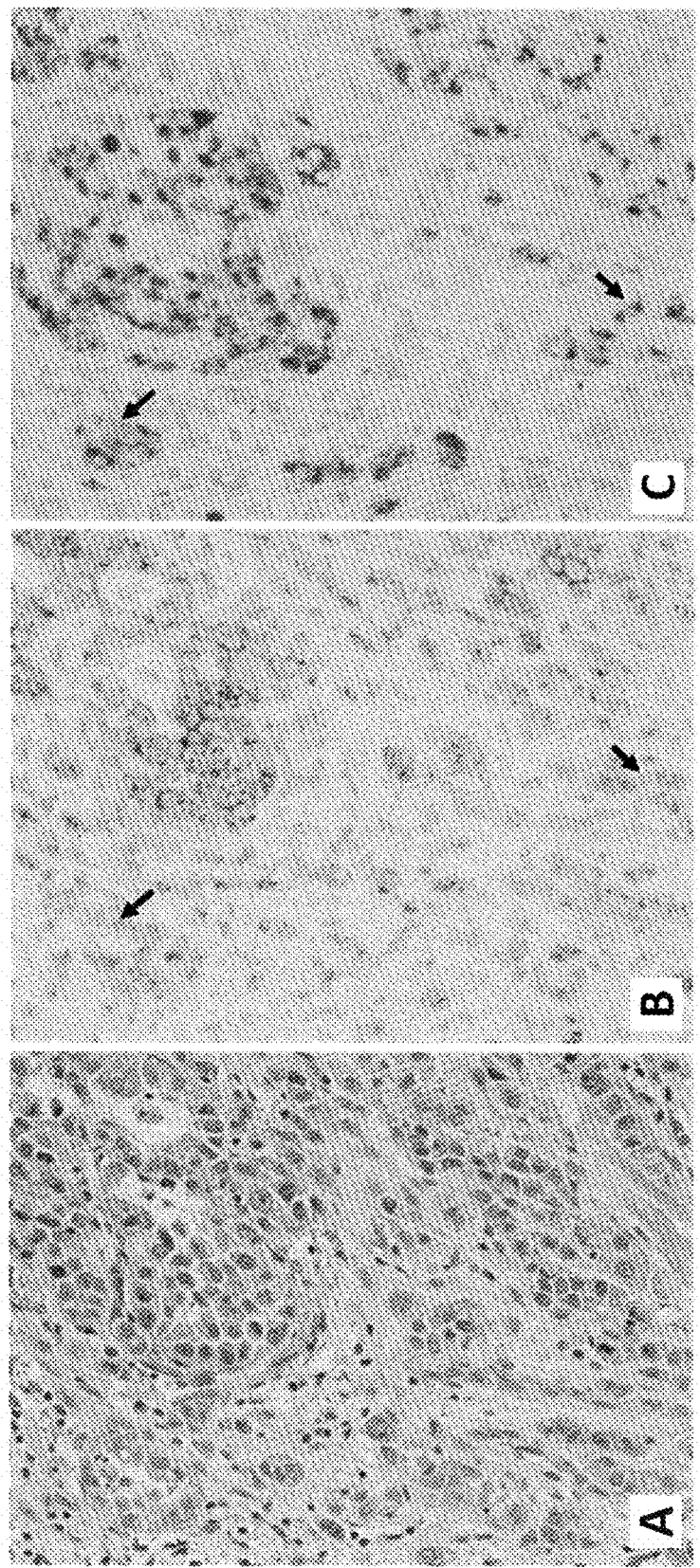
FIG. 11 shows HER2 non-genetic heterogeneity in gastric cancer in accordance with another embodiment of the present disclosure.
Figure 12:
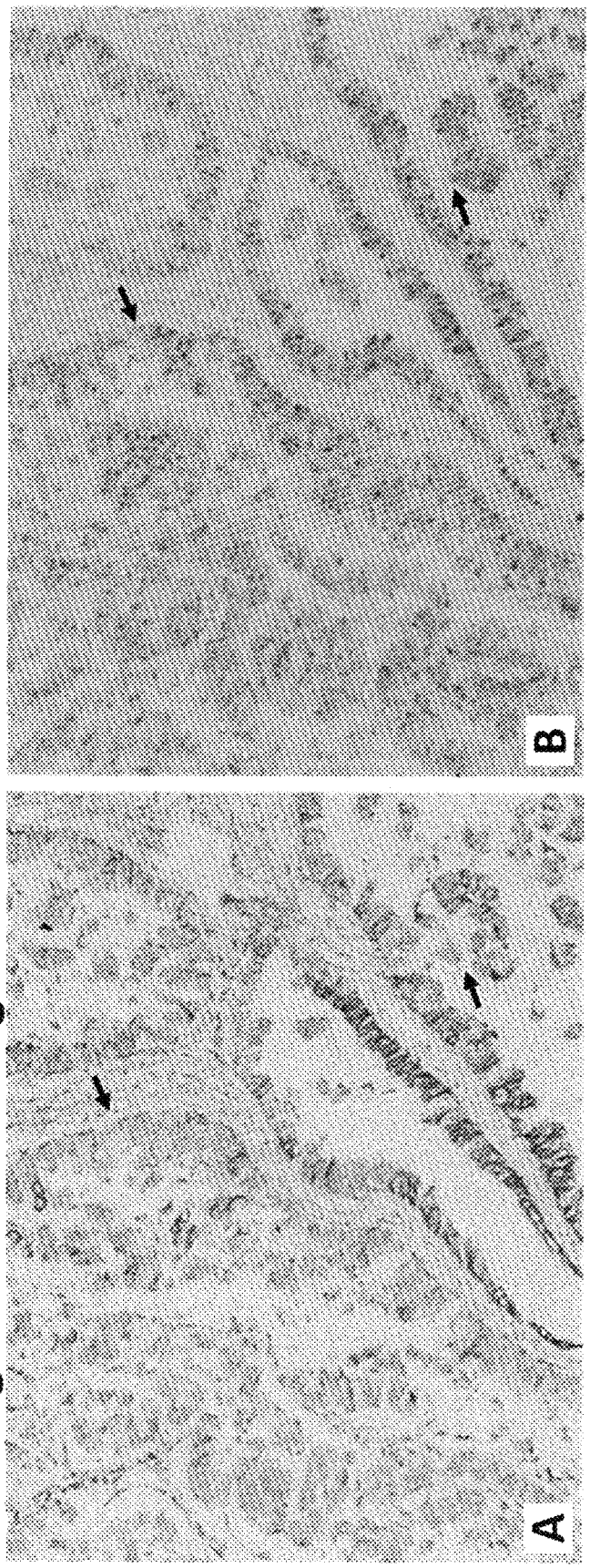
FIG. 12 shows HER2 non-genetic heterogeneity in gastric cancer in accordance with another embodiment of the present disclosure.

As one would expect, HER2 gene and HER2 protein negative GC cells (FIG. 6A) lack HER2 RNA expression (FIG. 6B). On the other hand, one would expect that homogeneous HER2 gene and protein positive tumor cells (FIGS. 7B and 8A) show high HER2 RNA expression levels (FIGS. 7C and 8B). FIG. 7A shows H&E (Haemotoxylin and Eosin) staining of GC samples.

FIGS. 9-12 show images of GC surgical tissue samples (not biopsy samples) stained for HER2 gene (black punctate nuclear staining) and HER2 protein (brown membrane staining) (FIGS. 9B, 10B, 11B, 12A), and HER2 RNA (red cytoplasmic staining) (FIGS. 9C, 10C, 11C, 12B). These samples are HER2 gene amplified and HER2 protein positive. However, some cells, e.g., those indicated by arrows, are negative for HER2 protein, though they have HER2 gene amplification and HER2 RNA overexpression.

The localization of this type of GC surgical tissue samples that has HER2 gene amplification and HER2 RNA overexpression without HER2 protein overexpression was further investigated microscopically with a pathologist. This type of HER2-positive tumor cells were found in mucosal and more deeply invasive cancer areas of submucosa and disrupted muscularis propria.

Thus, non-genetic HER2 ITH in GC was confirmed by a discovery of a new type of HER2 positive tumor cells presenting amplified HER2 gene and overexpressed RNA, but without HER2 protein overexpression. Since the HER2-targeted therapies target the HER2 protein, this heterogeneity could result in failure of the therapy to affect (e.g., inhibit or even kill) tumor cells that are HER2 gene amplified and HER2 RNA overexpression, but do not overexpress the HER2 protein. This unique HER2 ITH might be a cause of inefficient efficacy of HER2-targeted therapy suggesting a need for redefining HER2 ITH with non-genetic HER2 ITH in GC.

As noted above, non-genetic HER2 ITH in GC was identified by first performing HER2 gene-protein assay (GPA) on formalin-fixed, paraffin-embedded surgical tissue sections of gastric cancer cases and then performing HER2 RNA in situ hybridization (RNA-ISH) assay on serial sections of the same gastric cancer cases. HER2 ITH in GC may be identified by performing mRNA-ISH and protein IHC on separate serial sections. Alternatively, HER2 ITH may be identified by performing (1) mRNA-ISH, protein IHC/affinity histochemistry (AHC), and DNA-ISH on separate serial sections, (2) IHC for protein, then excise HER2 protein-negative regions using microdissection or mesodissection, then assay for mRNA in excised portion (such as by RT-PCR, qRT-PCR, etc.), and (3) duplex stain with mRNA-ISH and protein IHC in a single section.

Example 2

HER2 RNA-ISH, HER2 Protein IHC/AHC, and HER2 DNA-ISH on Separate Serial Surgical Tissue Sections HER2 RNA-ISH, HER2 protein IHC/AHC, and HER2 DNA-ISH may be performed as described above, except that each assay may be performed separately on separate serial surgical tissue sections.

Example 3

Analysis of HER2 Protein-Negative GC Surgical Tissues

HER2 protein IHC may be performed as described above. HER2 protein-negative regions may be excised using microdissection or mesodissection, followed by detection of HER2 mRNA using assays. The precise mechanism of identifying HER2 RNA expression is not necessarily confined to RNA-ISH. For example, HER2 protein-negative regions may be excised by microdissection or mesodissection and assay for HER2 RNA by RT-PCR or qRT-PCR. Alternatively, invasive regions in an H&E-stained slide may be identified and the invasive regions may be excised by microdissection or mesodissection, and assay the excised invasive regions for both HER2 protein (such as by ELISA) and HER2 RNA (such as by RT-PCR).

Example 4

HER2 RNA-ISH and HER2 Protein IHC without HER2 Dual ISH

HER2 RNA-ISH and HER2 protein IHC may be performed together as described above without the inclusion of HER2 Dual ISH, with each assay performed either on separate serial sections, or performed in duplex on a single surgical tissue section.

The present disclosure show HER2 heterogeneity in gastric cancer by identifying a sub-population of HER2 positive tumor cells, which contain amplified HER gene and HER2 RNA expression, but lack HER2 protein overexpression. This type of HER2 heterogeneity, i.e., HER2 gene amplification and HER2 RNA overexpression without HER2 protein overexpression, has not been previously described and appears to be counter-intuitive, because one would expect HER2 protein overexpression in HER2 DNA-amplified and HER2 RNA-overexpressing cancer cells. This discovery constitutes an unsuspected link to clinical variation in HER2-targeted therapy.

Advantages of the present disclosure may include (1) HER2 RNA-ISH images being easier to read than that of DNA-ISH to detect HER2 amplification. HER2-ISH may be more useful in other HER2-overexpressing cancers than in gastric cancer and breast cancer; and (2) gastric HER2 heterogeneity, e.g., GC containing amplified HER gene and HER2 RNA expression without HER2 protein overexpression, determined by the HER2 gene-protein assay (GPA) and HER2 RNA in situ hybridization (ISH) assay may be useful as a biomarker for cancer patient selections and treatment selections.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

The invention claimed is:

1. A method for HER-2 directed therapy comprising
(a) assessing HER2 heterogeneity in a tumor, comprising
  (i) contacting a sample of the tumor with a biomarker-specific reagent that specifically binds to HER2 protein and detecting HER2 protein in the sample,
  (ii) contacting the sample of the tumor with a first nucleic acid probe that specifically binds HER2 genomic DNA, and detecting HER2 gene amplification status in the sample,
  (iii) contacting the sample of the tumor with a second nucleic acid probe that specifically binds HER2 RNA, and detecting HER2 RNA status in the sample,
  wherein the sample is a surgical tissue sample,
  wherein the tumor is a solid tumor,
  wherein the tumor is gastric cancer,
(b) scoring the HER2 protein (IHC), HER2 gene (DISH), and HER2 RNA (RNA-ISH),
  wherein scoring is categorized as:
    Group A for samples exhibiting IHC 3+ and DISH+, and RNA-ISH+, Group B for samples exhibiting IHC 3+ and DISH–, and RNA-ISH–, Group C for samples exhibiting IHC 2+ and DISH+, RNA-ISH+, Group D for samples exhibiting IHC 2+ and DISH–, RNA-ISH–, Group E for samples exhibiting IHC 1+ and DISH+, RNA-ISH+, Group F for samples exhibiting IHC 1+ and DISH–, RNA-ISH–, Group G for samples exhibiting IHC 0 and DISH+, RNA-ISH+, and Group H for samples exhibiting IHC 0 and DISH–, RNA-ISH–, (c) predicting that the tumor is responsive to the HER2-directed therapy if the tumor reveals a first foci having a first score selected from Group A to Group G and a second foci having a second score selected from Group A to Group G, wherein the first score and the second score are not the same, and (d) when the first score and the second score are indicative of a tumor being responsive to HER2-directed therapy, administering HER-2 directed therapy selected from the group consisting of trastuzumab, trastuzumab emtansine, pertuzumab, neratinib, and lapatinib.

2. The method of claim 1, wherein the contacting a sample of the tumor with a biomarker-specific reagent and the contacting the sample of the tumor with a first nucleic acid probe are both performed on a first section of the sample and the contacting the sample of the tumor with the second nucleic acid probe is performed on a second section of the sample, wherein the second section is a serial section of the first section.

3. The method of claim 1, wherein the contacting a sample of the tumor with a biomarker-specific reagent is performed on a first section of the sample, the contacting the sample of the tumor with the first nucleic acid probe is performed on a second section of the sample, and the contacting the sample of the tumor with the second nucleic acid probe is performed on a third section of the sample, wherein the first, the second, and the third sections are serial sections.

4. The method of claim 1, wherein the contacting a sample of the tumor with a biomarker-specific reagent and the contacting the sample of the tumor with a second nucleic acid probe are performed on a same section of the sample.

* * * * *